(12) United States Patent
Cho et al.

(10) Patent No.: US 6,878,487 B2
(45) Date of Patent: Apr. 12, 2005

(54) ACTIVE MATERIAL FOR BATTERY AND METHOD OF PREPARING SAME

(75) Inventors: Jae-Phil Cho, Cheonan (KR); Won-Il Jung, Cheonan (KR); Yong-Chul Park, Cheonan (KR); Geun-Bae Kim, Suwon (KR)

(73) Assignee: Samsung SDI, Co., Ltd., Suwon-Si (KR)

( * ) Notice: Subject to any disclaimer, the term of this patent is extended or adjusted under 35 U.S.C. 154(b) by 278 days.

(21) Appl. No.: 10/091,335

(22) Filed: Mar. 6, 2002

(65) Prior Publication Data

US 2003/0049529 A1 Mar. 13, 2003

Related U.S. Application Data

(60) Provisional application No. 60/316,949, filed on Sep. 5, 2001.

(51) Int. Cl.$^7$ .......................... H01M 4/62; H01M 4/48; H01M 4/58
(52) U.S. Cl. .................... 429/212; 429/217; 429/231.1; 429/231.3; 429/231.4; 429/231.95; 29/623.5
(58) Field of Search ................................ 429/212, 217, 429/223, 224, 231.1, 231.3, 231.5, 232, 231.4, 231.8, 218.1, 231.95; 29/623.5

(56) References Cited

U.S. PATENT DOCUMENTS

| | | | |
|---|---|---|---|
| 5,292,601 A | 3/1994 | Sugeno et al. .............. 429/332 |
| 5,705,291 A | 1/1998 | Amatucci et al. ........... 429/137 |
| 5,910,382 A | 6/1999 | Goodenough et al. ... 429/218.1 |
| 6,174,623 B1 * | 1/2001 | Shackle ................... 429/218.1 |
| 6,255,019 B1 * | 7/2001 | Sakamoto et al. .......... 429/223 |
| 6,258,483 B1 * | 7/2001 | Abe ........................... 429/223 |
| 6,338,917 B1 * | 1/2002 | Maeda et al. ................ 429/223 |
| 6,492,061 B1 * | 12/2002 | Gauthier et al. ........ 429/232 X |
| 6,534,217 B2 * | 3/2003 | Koga et al. ............ 429/231.95 |
| 6,537,701 B1 * | 3/2003 | Nimon et al. .......... 429/231.95 |
| 6,548,210 B1 * | 4/2003 | Shinyama et al. .......... 429/223 |
| 6,558,841 B1 * | 5/2003 | Nakagiri et al. ......... 429/218.1 |
| 6,562,516 B2 * | 5/2003 | Ohta et al. .................. 429/223 |
| 6,573,006 B2 * | 6/2003 | Nishiyama et al. ......... 429/223 |
| 2001/0018148 A1 * | 8/2001 | Ohta et al. ................... 429/223 |

FOREIGN PATENT DOCUMENTS

| | | | | |
|---|---|---|---|---|
| JP | 09-055210 | 2/1997 | | H01M/4/58 |
| JP | 11-016566 | 1/1999 | | H01M/4/02 |
| JP | 11-185758 | 7/1999 | | H01M/4/58 |
| JP | 11-307116 | * 11/1999 | | H01M/4/62 |
| JP | 2001-202958 | * 7/2001 | | H01M/4/62 |

* cited by examiner

Primary Examiner—Stepheh J. Kalafut
(74) Attorney, Agent, or Firm—Staas & Halsey LLP

(57) ABSTRACT

An active material for a battery is provided with a coating layer based on a conductive agent, or a coating layer based on a mixture of a conductive agent, and a conductive polymeric dispersant.

48 Claims, 13 Drawing Sheets

Super P(conductive agent) powders are conglomerated

Super P(conductive agent)powders are aggregated

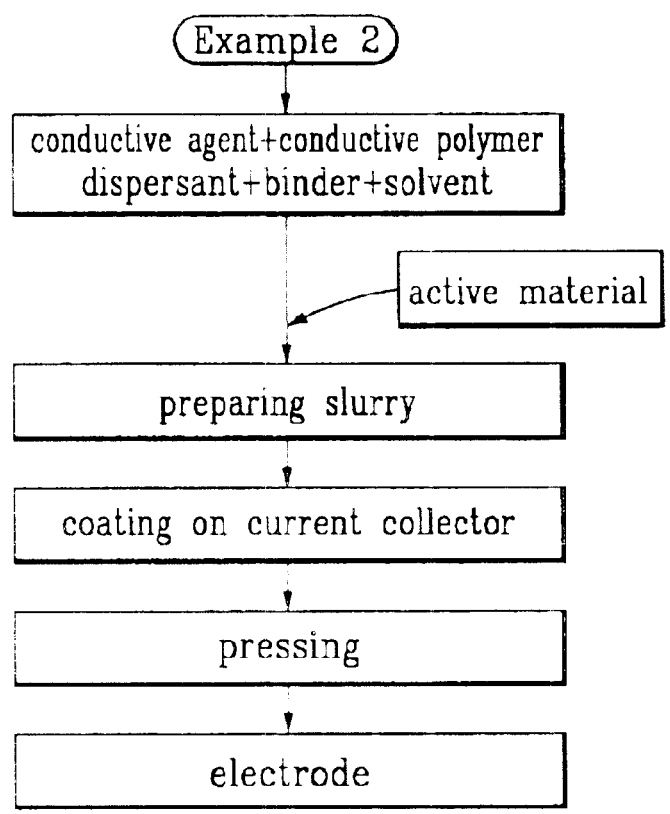

ACTIVE MATERIAL FOR BATTERY AND METHOD OF PREPARING SAME

This application claims the benefit of application Ser. No. 60/316,949 filed on Sep. 5, 2001.

BACKGROUND OF THE INVENTION (a) Field of the Invention

The present invention relates to an active material for a battery and a method of preparing the same, and more particularly, to an active material for a battery with excellent electrochemical characteristics and thermal stability, and a method of preparing the same.

(b) Description of the Related Art

In recent times, pursuant to reductions in size and weight of portable electronic equipment, there has been a need for developing batteries for such portable equipment with high energy density and high power density. Furthermore, it is required that such batteries be produced in a cost effective manner while being reliable and safe.

Batteries are usually classified as primary batteries that can be used only once and then disposed of, and secondary batteries that can be recharged and used repeatedly. Primary batteries include manganese batteries, alkaline batteries, mercury batteries, and silver oxide batteries. Secondary batteries include lead-acid storage batteries, nickel-metal hydride (Ni—MH) batteries, sealed nickel-cadmium batteries, lithium metal batteries, lithium ion batteries, lithium polymer batteries, and lithium-sulfur batteries.

Such batteries generate electric power through using an electrochemical reaction material (referred to hereinafter simply as the "active material") for a positive electrode and a negative electrode. Critical factors for determining battery capacity, safety and reliability are electrochemical characteristics and thermal stability of the active material and extensive research has been made to improve such factors.

Of currently available active materials, lithium metal involves high energy density per unit volume and high electronegativity, and hence it can be well adapted for use in producing high voltage battery cells. However, lithium metal also involves safety problems when it is used alone. Accordingly, it has been widely proposed that a material capable of intercalating or deintercalating lithium metal or ions might be used for the active material.

For instance, a rechargeable lithium battery cell generates electric energy by way of oxidation and reduction reactions (called "redox") occurring when the lithium ions are intercalated and deintercalated at the positive and negative electrodes. In a rechargeable lithium battery cell, a material having a structure where lithium ions can be reversibly intercalated and deintercalated during charge and discharge is used for the positive and negative electrodes, and an organic electrolyte or a polymer electrolyte is filled between the positive and the negative electrodes.

Lithium metal has been used as the negative active material. However, with the use of lithium metal, dendrites may be formed within the battery cell, causing short circuits and explosion of the battery cell. Therefore, a carbon-based material such as amorphous carbon or crystalline carbon has replaced metallic lithium. Particularly, boron-coated graphite (BOC), where boron is added to the carbon-based material, has recently been spotlighted as a high capacity negative active material.

It has been proposed that lithium metal oxides such as $LiCoO_2$, $LiMn_2O_4$, $LiNiO_2$, $LiNi_{1-x}Co_xO_2$ (0<x<1) and $LiMnO_2$, or chalcogenide compounds might be used as the positive active material for the lithium secondary battery. Manganese-based positive active materials such as $LiMn_2O_4$ and $LiMnO_2$ can be easily synthesized at a low cost while contributing little to environmental pollution. However, such a manganese-based positive active material bears a low capacity. $LiCoO_2$ is currently the most popular material for the positive electrodes of commercially available lithium secondary battery. This compound has high electrical conductivity, high cell voltage and excellent electrode characteristics, but it involves high production costs. Among the above positive active materials, $LiNiO_2$ involves the lowest cost while bearing the highest discharge capacity, but it cannot be easily synthesized.

95% of the batteries that are circulated throughout the world use the $LiCoO_2$-based positive active material, and there have been continual attempts to replace this high-cost active material with a new one. Rechargeable lithium batteries using a powder of $LiCoO_2$ for the positive electrode exhibit relatively long shelf life and an excellent discharge profile, but there is also a need to make consistent improvements to such batteries.

In order to improve the $LiCoO_2$-based positive active material, research has been carried out on the substitution of metal oxide for a part of the Co. The Sony corporation developed a powder of $LiCo_{1-x}Al_xO_2$ where $Al_2O_3$ is doped at about 1 to 5 wt. % and Al is substituted for part of the Co, and applied it for use in mass production. The A&TB (Asahi & Toshiba Battery Co.) company developed a positive active material where $SnO_2$ is doped, and Sn is substituted for part of the Co.

U.S. Pat. No. 5,292,601 disclosed $Li_xMO_2$ where M is one or more elements selected from Co, Ni or Mn, and x is 0.5 to 1, as an improved active material over $LiCoO_2$. U.S. Pat. No. 5,705,291 discloses a technique where a material selected from boron oxide, boric acid, lithium hydroxide, aluminum oxide, lithium aluminate, lithium metaborate, silicon dioxide, lithium silicate or mixtures thereof is mixed with a lithiated intercalation compound, and the mixture is baked at 400° C. or more such that the oxide content is coated onto the surface of the lithiated intercalation compound.

Japanese Patent Laid-Open No. 9-55210 discloses a positive active material prepared through coating an alkoxide of Co, Al and Mn on the lithium-nickel based oxide, and heat-treating the alkoxide-coated oxide. Japanese Patent Laid-Open No. 11-16566 discloses a lithium-based oxide material coated with metal selected from Ti, Sn, Bi, Cu, Si, Ga, W, Zr, B or Mo, and/or an oxide thereof. Japanese Patent Laid-Open No. 11-185758 discloses a positive active material where metal oxide is coated onto lithium manganese oxide through dipping, and heat treatment is performed thereto.

As shown in FIG. 1, the currently available positive electrode is fabricated through dry-mixing an active material with a conductive agent, adding the mixture to a binder-containing solution to prepare a slurry, and coating the slurry onto a current collector and pressing it to thereby form an electrode. The conductive agent has a large surface area of 2500 $m^2$/g or more, and hence it causes an increase in the thickness of the electrode. Furthermore, the amount of active material is decreased by the amount of a conductive agent added, and this works as a hindrance to the fabrication of a high capacity battery.

In order to solve such a problem, it has been proposed that the amount of the conductive agent and the binder should be decreased. However, such a technique cannot well serve to improve the electrochemical characteristics of the battery.

In the above description, positive active materials of lithium secondary batteries and related examples of developments were explained. Recently, in relation to the tendency to develop portable electronic equipment that is more compact and lightweight, other types of batteries have the same demands for an active material that guarantees battery performance, safety and reliability. Research and development is therefore accelerated on electrochemical properties and thermal stability of positive active materials to ensure improved performance, safety and reliability of batteries.

SUMMARY OF THE INVENTION

It is an object of the present invention to provide an active material for a battery which bears excellent electrochemical characteristics and thermal stability.

It is another object of the present invention to provide a method of preparing an active material for a battery in a cost-effective manner while involving high production efficiency.

It is still another object of the present invention to provide a high density electrode for a battery.

It is still another object of the present invention to provide a battery which exhibits excellence in cell capacity and safety.

These and other objects may be achieved by an active material for a battery with a coating layer comprising a conductive agent, or a coating layer comprising a mixture of a conductive agent and a conductive polymeric dispersant.

According to one aspect of the present invention, the active material is prepared through the steps of: (a) preparing a coating liquid where a conductive agent, a dispersant and a surfactant are dispersed in a solvent, (b) adding an active material to the coating liquid such that the conductive agent is coated onto the surface of the active material, and (c) heat-treating the coated active material.

According to another aspect of the present invention, the active material is prepared through the steps of: (a) preparing a coating liquid where a conductive agent and a dispersant are dispersed in a solvent, (b) adding an active material to a surfactant-coating solution, and thoroughly mixing the solution, (c) mixing the coating liquid made at the (a) step with the active material-containing solution made at the (b) step such that the conductive agent is coated onto the surface of the active material, and (d) heat-treating the coated active material.

According to still another aspect of the present invention, the active material is prepared through the steps of: (a) preparing a coating liquid where a conductive agent and a conductive polymeric dispersant are dispersed in a solvent, (b) adding an active material to the coating liquid, (c) coating the conductive agent and the conductive polymeric dispersant onto the surface of the active material, and (d) heat-treating the coated active material.

An electrode comprising the coated active material may be fabricated through the steps of: (a) preparing a binder-containing solution where a binder is dissolved in a solvent, (b) adding the coated active material to the binder-containing solution to thereby prepare a slurry, and (c) coating the slurry onto a current collector and pressing it to thereby form an electrode.

Alternatively, the electrode may be fabricated through the steps of: (a) preparing a coating liquid where a conductive agent, a conductive polymeric dispersant and a binder are dispersed in a solvent, (b) adding an active material to the coating liquid to thereby prepare a slurry where the conductive agent and the conductive polymeric dispersant are coated onto the surface of the active material, and (c) coating the slurry onto a current collector and pressing it to thereby form an electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Figure 1A:
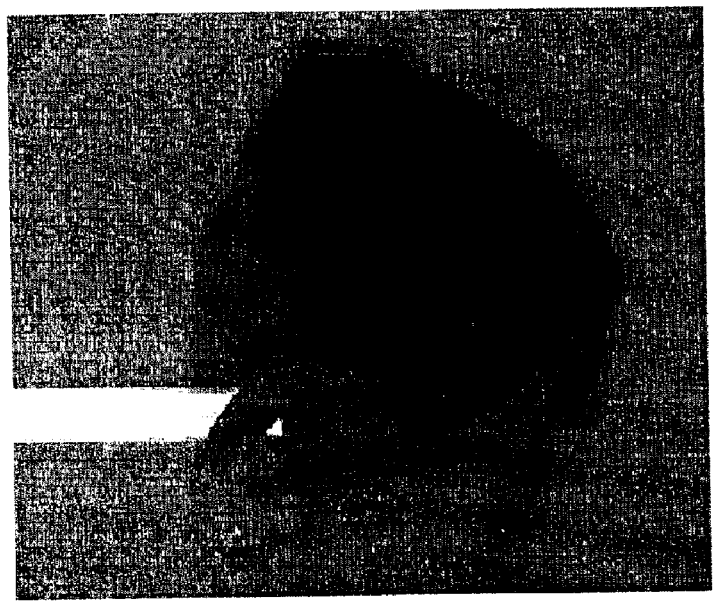
FIG. 1A illustrates the diffusion degree of a conductive agent in the presence of a dispersant.

Preferred embodiments of this invention will be explained in detail.

According to the present invention, the conductive agent to be conventionally added to a slurry for fabricating an electrode is directly coated onto an active material. That is, the active material is overlaid with a coating layer comprising a conductive agent, or a mixture of a conductive agent and a conductive polymeric dispersant.

Conventionally, the active material and the conductive agent are mixed in the slurry for electrode fabrication. However, in the present invention, the conductive agent is directly coated onto the active material so that the amount of the conductive agent required for the electrode fabrication can be decreased. Consequently, the addition reaction of the conductive agent with the electrolyte is reduced while decreasing the occurrence of gas in the battery cell. This prohibits swelling of the battery cell while securing safety thereof.

Any materials capable of electrochemically undergoing the oxidation-reduction reactions can be used for the active material. The electrochemically oxidizable and reducible material includes a metal, a lithium-containing alloy, sulfur-based compounds, compounds that can reversibly form lithium-containing compounds by a reaction with lithium ions, and all materials that can reversibly intercalate/deintercalate lithium ions (lithiated intercalation compounds), although the present invention is not limited thereto.

The metal includes lithium, tin or titanium. The lithium-containing alloy includes a lithium/aluminum alloy, a lithium/tin alloy, or a lithium/magnesium alloy. The sulfur-based compounds, which form the positive active material of the lithium-sulfur battery, include a sulfur element, $Li_2S_n$ ($n \geq 1$), an organic sulfur compound and a carbon-sulfur polymer (($C_2S_x)_n$ where x=2.5 to 50 and $n \geq 2$). The compound that can reversibly form a lithium-containing compound by a reaction with lithium ions includes silicon, titanium nitrate or tin oxide.

The active materials that can reversibly intercalate/deintercalate lithium ions (lithiated intercalation compounds) include carbon-based materials, lithium-containing metal oxides, and lithium-containing chalcogenide compounds. The carbon-based material can be non-crystalline carbon, crystalline carbon, or a mixture thereof. Examples of the non-crystalline carbon include soft carbon (low-temperature calcinated carbon), and hard carbon (high-temperature calcinated carbon). Examples of crystalline carbon include natural graphite or artificial graphite which are of a plate, sphere or fiber shape.

The lithium-coating metal oxide and lithium-containing chalcogenide compound has a monoclinic, hexagonal or cubic structure as a basic structure.

A conventional lithium-containing compound (lithium-containing metal oxide and lithium-containing chalcogenide compound) can be used as the lithiated intercalation compound of the present invention, and preferable examples are compounds having the following formulas (1) to (13):

$Li_xMn_{1-y}M'_yA_2$ (1)
$Li_xMn_{1-y}M'_yO_{2-z}A_z$ (2)
$Li_xMn_2O_{4-z}A_z$ (3)
$Li_xMn_{2-y}M'_yA_4$ (4)
$Li_xCo_{1-y}M'_yA_2$ (5)
$Li_xCoO_{2-z}A_z$ (6)
$Li_xNi_{1-y}M'_yA_2$ (7)
$Li_xNiO_{2-z}A_z$ (8)
$Li_xNi_{1-y}Co_yO_{2-z}A_z$ (9)
$Li_xNi_{1-y-x}Co_yM'_zA_a$ (10)
$Li_xNi_{1-y-z}Co_yM'_{zy}O_{2-a}A_2$ (11)
$Li_xNi_{1-y-z}Mn_yM'_zA_a$ (12)
$Li_xNi_{1-y-z}Mn_yM'_zO_{2-a}A_a$ (13)

wherein $0.95 \leq x \leq 1.1$, $0 \leq y \leq 0.5$, $0 \leq z \leq 0.5$, $0 < a \leq 2$;

M' is at least one element selected from the group consisting of Al, Ni, Co, Mn, Cr, Fe, Mg, Sr, V, and a rare-earth element; and A is at least one element selected from the group consisting of O, F, S and P.

The average diameter of the lithium-containing compound is preferably in the range of 1 to 50 μm, more preferably in the range of 5 to 20 μm, and most preferably in the range of 5 to 10 μm.

The coating layer formed on the surface of the active material contains a conductive agent, or a mixture of a conductive agent and a conductive polymeric dispersant.

The conductive agent may be selected from a carbon-based conductive agent, a graphite-based conductive agent, a metal-based conductive agent or a metallic compound-based conductive agent, but it is not limited thereto.

KS6 (produced by the Timcal company) may be used as the graphite-based conductive agent. The carbon-based conductive agent may be selected from Super P (produced by the MMM company), ketchen black, denka black, acetylene black, carbon black, thermal black, or channel black. The metal or metallic compound-based conductive agent may be selected from tn, tin oxide or tin phosphate ($SnPO_4$).

The amount of the conductive agent in the coating layer is preferably in the range of 0.1 to 10 wt. % of the active material, and more preferably in the range of 1 to 4 wt. %. In the case the amount of the conductive agent is less than 0.1 wt. %, the electrochemical characteristics of the active material become deteriorated. By contrast, in the case the amount of the conductive agent is more than 10 wt. %, the energy density per weight of the active material is decreased.

It is preferable that the average particle diameter of the conductive agent in the coating layer is 1 μm or less. In such a diameter range, the conductive agent is well attached to the surface of the active material. By contrast, the conductive agent cannot be well attached to the active material in the diameter range of more than 1 μm.

According to a first preferred embodiment of the present invention, the coated active material can be prepared through the steps of: (a) preparing a coating liquid where a conductive agent, a dispersant and a surfactant are dispersed in a solvent, (b) adding an active material to the coating liquid to thereby coat the conductive agent onto the surface of the active material, and (c) heat-treating the coated active material.

According to a second preferred embodiment of the present invention, the coated active material can be prepared through the steps of: (a) preparing a coating liquid where a conductive agent and a dispersant are dispersed in a solvent, (b) adding an active material to a surfactant-containing solution to make an active material-containing solution, (c) mixing the coating liquid made at the (a) step with the active material-containing solution made at the (b) step to thereby coat the conductive agent onto the surface of the active material, and d) heat-treating the coated active material.

The dispersant for dispersing the conductive agent may be selected from a polyacrylate-based resin; polyethylene oxide; a block polymer of $(EO)_l(PO)_m(EO)_l$ where EO indicates ethylene oxide, PO indicates propylene oxide, and l and m are in the numerical range of 1 to 500; polyvinyl chloride (PVC); an acrylonitrile/butadiene/styrene (ABS) polymer; an acrylonitrile/styrene/acrylester (ASA) polymer; a mixture of the ABS polymer and propylene carbonate; a styrene/acrylonitrile (SAN) copolymer; or a methylmethacrylate/acrylonitrile/butadiene/styrene (MABS) polymer. A resin of Orotan™ may be used for the polyacrylate-based resin.

Figure 1B:
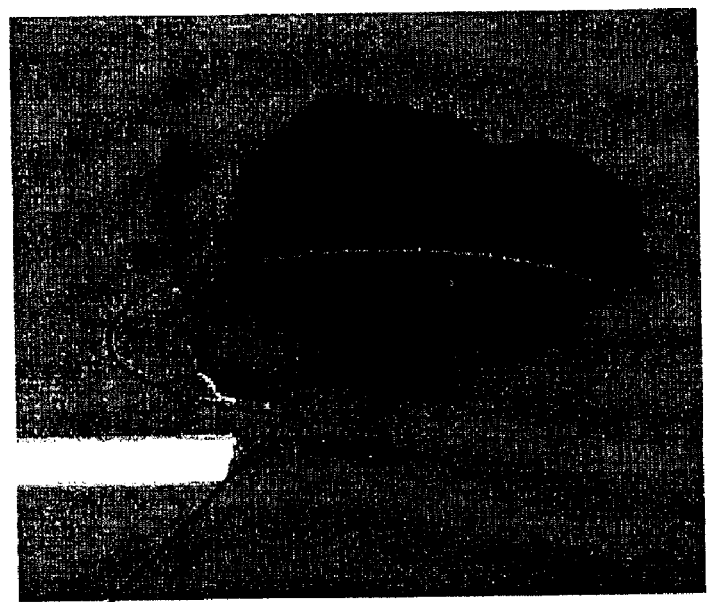
FIG. 1B illustrates the diffusion degree of a conductive agent in the absence of the dispersant.
Figure 2A:
FIG. 2 illustrates the diffusion state of an active material with the addition of a surfactant.
Figure 2B:
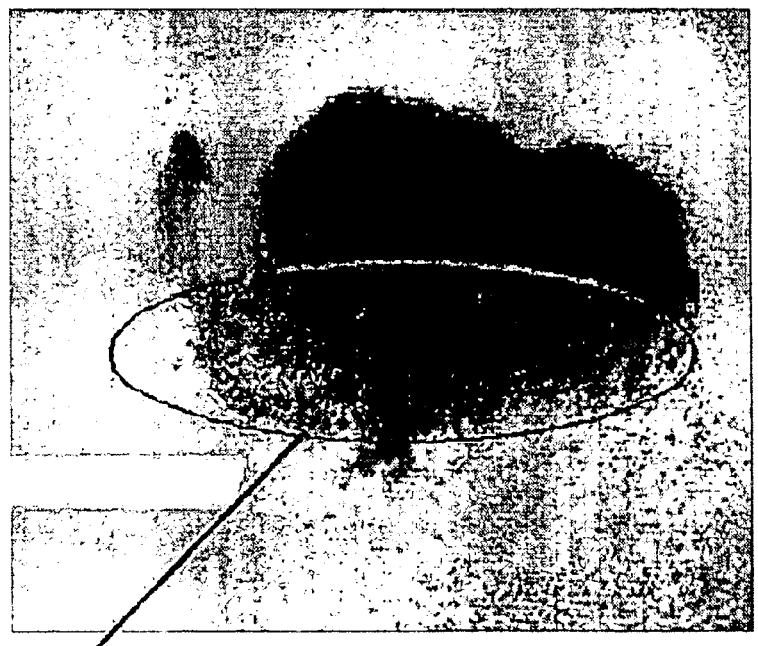

The amount of the dispersant is preferably in the range of 0.1 to 20 wt. % of the conductive agent. The diffusion state of the conductive agent (Super P) in a solvent of N-methyl pyrrolidone with or without the dispersant in the N-methyl pyrrolidone solvent is illustrated in FIGS. 1A and 1B. As shown in FIG. 1A, the conductive agent is uniformly dispersed in the presence of the dispersant. By contrast, as shown in FIG. 1B, the conductive agent is not uniformly distributed in the absence of the dispersant, but conglomerated sporadically.

The surfactant works as a binder for binding the conductive agent to the active material. Non-ionic, anionic and cationic materials as well as organic or inorganic materials may all be used as the surfactant. The surfactant includes a hydrophilic head group and a hydrophobic tail group in its respective molecules. The hydrophilic head group includes an ionic group and a non-ionic group. The ionic group makes static-electricity bonding, and the non-ionic group makes hydrogen bonding.

For instance, the compounds having the ionic group include sulfonate ($RSO_3$), sulfate ($RSO_4$), carboxylate (RCOO), phosphate ($RPO_4^-$), ammonium ($R_xH_yN^+$: x is in the numerical range of 1 to 3, and y is in the numerical range of 3 to 1), quaternary ammonium ($R_4N^+$), betaines ($RN^+(CH_3)_2CH_2COO^-$), and sulfobetaines ($RN^+(CH_3)_2CH_2SO_3^-$). The compounds having the non-ionic group include polyethylene oxide ($R-OCH_2CH_2(OCH_2CH_2)_n OH$), amine compounds, and gelatins. In the above compounds, R indicates the saturated or non-saturated hydrogen carbide where the number of carbons is preferably in the range of 2 to 1000. The surfactant bears a molecular weight preferably in the range of 5 to 10,000, more preferably in the range of 50 to 5000, and most preferably in the range of 50 to 300.

Figure 2:
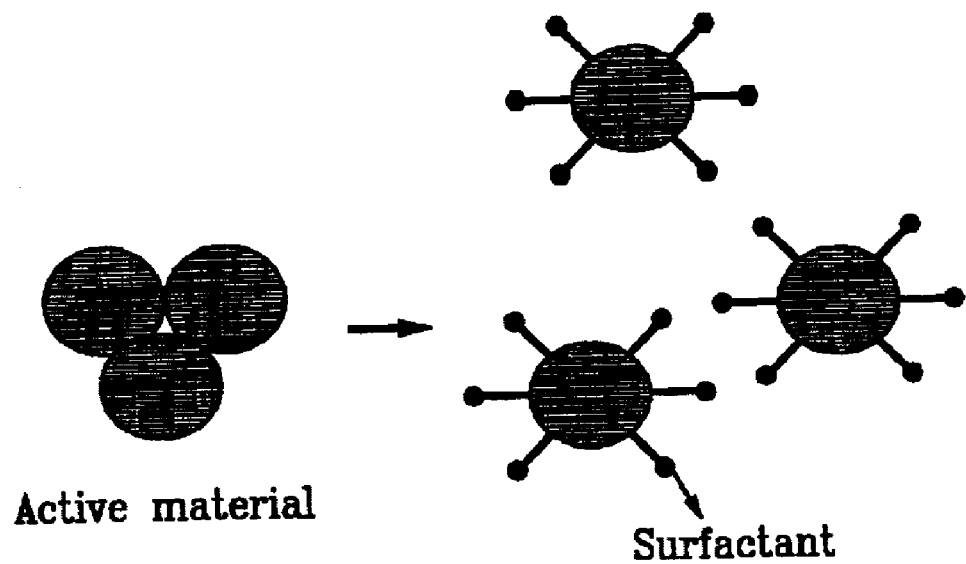

The active materials bears a hydrophobic property. Therefore, when the active material is dispersed in a solvent together with the surfactant, as shown in FIG. 2, the molecules of the active material are separated from each other, and dispersed.

The amount of the surfactant is preferably 0.1 to 20 wt. % of the conductive agent. Within this range, the amount of the conductive agent to be coated onto the active material can be controlled in a desired manner.

In the case of a surfactant with both anions and cations, the pH of the coating liquid affects the amount of the conductive agent to be coated onto the active material. When betaines, sulfobetaines, or gelatins are used as the surfactant, it is preferable that in the coating process according to the second preferred embodiment of pH of the surfactant-containing solution to be used at the (b) step is kept to be 3 to 4, and the pH of the conductive agent-containing solution at the (c) step is kept to be 5 to 8, and more preferably to be 6 or 7.

The method of preparing such a coated active material using gelatin includes the steps of: (a) preparing a coating liquid where a conductive agent and a dispersant are dispersed in a solvent, (b) preparing a gelatin-containing solution where gelatin is dissolved in a solvent and adding an acid to the gelatin-containing solution while controlling the pH thereof to be 3 to 4, c) adding an active material to a gelatin-containing solution followed by agitating, d) removing the gelatin residue from the surface of the active material to obtain an active material-containing solution while controlling the pH of the active material-containing solution to be 5 to 8, e) mixing the coating liquid made at the (a) step with the active material-containing solution made at the (d) step to thereby coat the conductive agent onto the surface of the active material, and e) heat-treating the coated active material. The pH is controlled with the addition of an acid or base such as acetic acid, hydrochloric acid, sulfuric acid, or ammonia.

The solvent may be selected from water, organic solvent, or a mixture thereof. The organic solvent may be selected from alcohols such as methanol, ethanol and isopropanol, hexane, chloroform, tetrahydrofuran, ether, methylene chloride, acetone, acetonitrile, or N-methyl pyrrolidone (NMP). In the case the surfactant is a compound bearing an ionic group, an organic solvent is preferably used for the solvent. In the case the surfactant is a compound bearing a non-ionic group, water is preferably used for the solvent.

The coating of the active material is preferably made by way of a wet coating technique such as spray coating, or impregnation dip coating.

In the above process, the heat treatment is preferably done at 100 to 500° C., and the period of time for the heat treatment is preferably in the range of 1 to 20 hours. The surfactant, and the dispersant used for dispersing the conductive agent are removed during the heat treatment process. In the case the heat treatment temperature is less than 100° C., the surfactant residue is present at the surface of the active material while making bad effects to the electrochemical characteristics thereof. In the case the heat treatment temperature is over 500° C., the amount of the conductive agent is undesirably decreased.

Under the application of a conductive polymeric dispersant, the coated active material can be easily prepared compared to the case where the usual surfactant is used.

In a third preferred embodiment of the present invention, the active material coated with a mixture of a conductive polymeric dispersant and a conductive agent is prepared through the steps of: (a) preparing a coating liquid where a conductive agent and a conductive polymeric dispersant are dispersed in a solvent, (b) adding an active material to the coating liquid, (c) coating the conductive agent and the conductive polymeric dispersant onto the active material, and (d) heat-treating the coated active material.

In the case a conductive polymeric dispersant is used as the surfactant the conductive agent and the conductive polymeric dispersant are coexistent at the coating layer of the active material. That is, the conductive polymeric dispersant is existent on the surface of the active material while being differentiated from a usual surfactant. As with the conductive agent, the conductive polymeric dispersant forms a conductive network to thereby improve the electrochemical characteristics of the active material. The conductive polymeric dispersant has a role of dispersing the conductive agent, and also functions as a surfactant for attaching the conductive agent to the active material.

The conductive polymeric dispersant may be selected from polyethylene oxide; polypropylene oxide; a block copolymer of $(EO)_l(PO)_m(EO)_l$ where EO indicates ethylene oxides, PO indicates propylene oxide, and l and m are in the numerical range of 1 to 500; polyvinylidene chloride (PVC); an acrylonitrile/butadiene/styrene (ABS) polymer; an acrylonitrile/styrene/acrylester (ASA) polymer; a mixture of the ABS polymer and propylene carbonate; a styrene/acrylonitrile (SAN) copolymer; or a methylmethacrylate/acrylonitrile/butadiene/styrene (MABS) polymer. Among them, the $(EO)_l(PO)_m(EO)_l$ is the best candidate for the conductive polymeric dispersant.

In the $(EO)_l(PO)_m(EO)_l$ block copolymer, propylene oxide bears a hydrophobic property, and hence is attached to the active material or the conductive agent. Ethylene oxide bears a hydrophilic property and conductivity, and hence has a role of interconnecting the active material and the conductive agent while conducting the lithium ions. The currently available conductive polymeric dispersant may be selected from P-series in a cake state (produced by the BASF company), or F-series in a powder state (produced by the BASF company).

The conductive agent frequently employed for use in the conductive agent coating process with a usual surfactant can be directly used for the present conductive agent. It is preferable that the amount of the conductive polymeric dispersant is 0.1 to 20 wt. % of the conductive agent.

The solvent suitable for the conductive polymeric dispersant may be selected from alcohols such as methanol, ethanol and isopropanol, hexane, chloroform, tetrahydrofuran, ether, methylene chloride, acetone, acetonitrile, or N-methyl pyrrolidone (NMP).

Since there is no need to remove the conductive polymeric dispersant, the heat treatment temperature may be established to be 100° C. or less.

The coating of the active material is preferably made by way of a usual wet coating technique such as spray coating, and impregnation dip coating.

A coating layer based on $MPO_4$, $MSO_4$ or $MWO_4$, where M is a group 3B element, may be formed on the active material using a surfactant to improve the stability and electrochemical characteristics of the active material. For instance, an active material with a coating layer of $MPO_4$ may be prepared through the steps of: (a) adding an active material and a phosphate-based surfactant to an alcohol-based solvent, b) adding a compound of $MX_3$, where M is a group 3B element and X is a halogen element, to the active material-containing solution such that $M^{3+}$ ions form static electricity bonding with the hydrophilic head group of the surfactant, and c) filtering the active material with the static electricity bonding, and baking it at low temperature to thereby form a mesoporous $MPO_4$ coating layer on the surface of the active material. When a sulfate-based surfactant is used instead of a phosphate-based surfactant, an $MSO_4$ coating layer is formed on the surface of the active material.

The coating layer comprising the conductive agent or the mixture of the conductive agent and the conductive polymeric dispersant reduces the internal resistance of the active material while preventing the discharge potential thereof from being deteriorated. Accordingly, a high discharge potential can be maintained in a constant irrespective of variation in the current density (C-rate). This is because the conductive agent coated on the surface of the active material reduces the surface polarization. Accordingly, in the case the surface-treated active material is applied for practical use in the battery cell, the performance characteristics of the battery cell such as cycle life, discharge potential and power density can be improved.

When the active material coated with a conductive agent is used in the battery cell fabrication, the density of the electrode active material is enhanced so that the energy density of the resulting battery cell is heightened in a significant manner. Particularly, it can largely serve to make prismatic battery cells bear a slim size while involving a high capacity.

In order to be marketable, batteries should pass various stability tests. The penetration test in which a nail is passed through a charged battery cell, is critical for guaranteeing the stability of the battery. The stability of the battery depends on various factors, especially exothermic reaction caused by reacting the charged positive electrode with electrolyte immersed in the charged positive electrode.

For instance, when a coin cell including an active material of $LiCoO_2$ is charged by a predetermined electric potential, $LiCoO_2$ is converted to $Li_{1-x}CoO_2$. The thermal stability of the active material can be judged based on the exothermic starting temperature and exothermic heat amount, from the measurement of differential scanning calorimetry (DSC) with respect to the charged material. The active material of $Li_{1-x}CoO_2$ is unstable in its charged state. Accordingly, the internal temperature of the battery cells is heightened so that the oxygen content is separated from the cobalt content. The separated oxygen content reacts with the electrolyte, and this can cause an possible explosion of the battery cell. Therefore, the oxygen releasing temperature (the exothermic starting temperature) and the exothermic heat amount are important factors in representing the stability of the battery cell. The inventive active material involves significantly reduced exothermic heat, and this insures thermal stability of the resulting battery cell.

A high-density electrode can be fabricated using the active material where a surface-treatment layer is present and also comprises a coating compound and a conductive agent. The electrode is fabricated through the steps of: (a) preparing a binder-containing solution where a binder is dissolved in a solvent, b) adding the active material to the binder-containing solution to prepare a slurry, and c) coating the slurry onto a current collector and pressing it to thereby form an electrode.

Figure 3A:
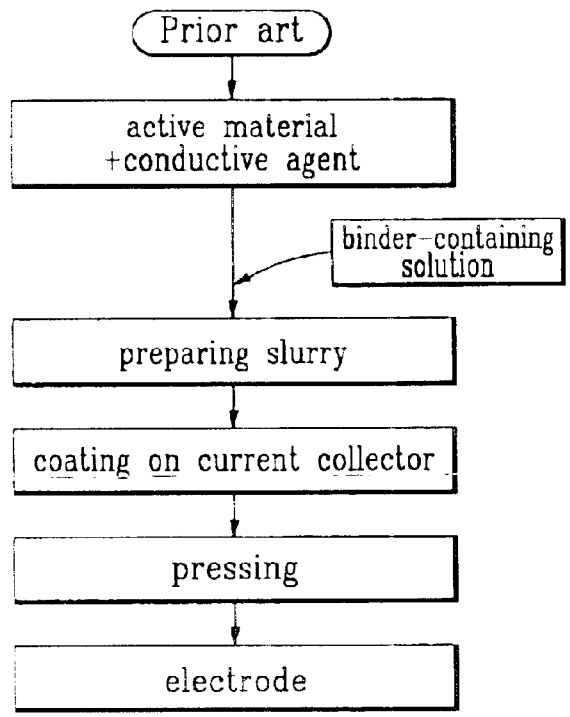
FIG. 3A illustrates the steps of fabricating an electrode using an active material according to a prior art.
Figure 3B:
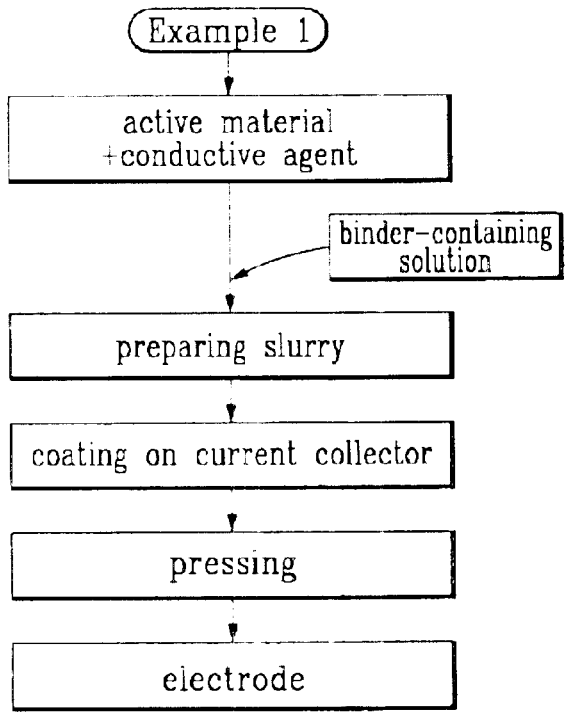
FIG. 3B illustrates the steps of fabricating an electrode using an active material according to a preferred embodiment of the present invention.
Figure 3A:
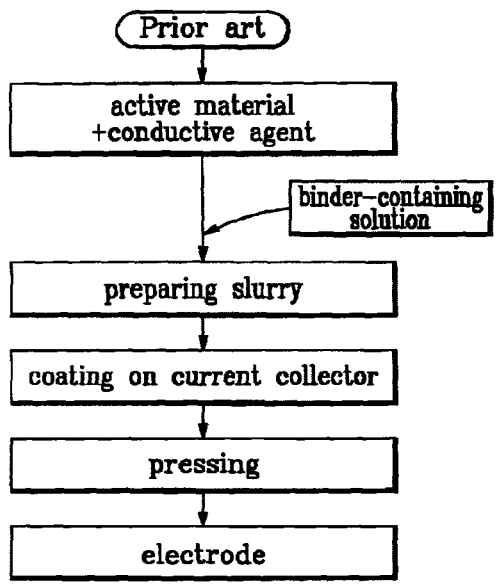
Figure 3B:
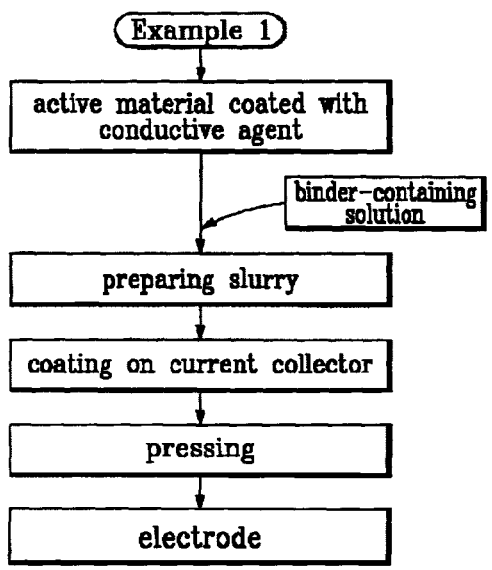
Figure 3C:
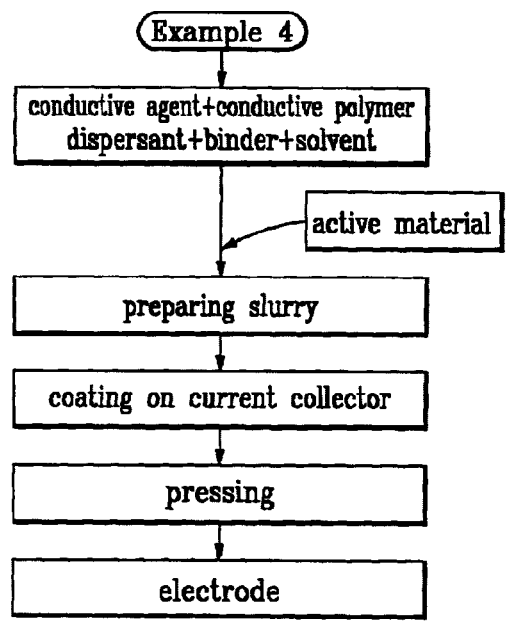
FIG. 3C illustrates the steps of fabricating an electrode using an active material according to another preferred embodiment of the present invention.
Figure 4:
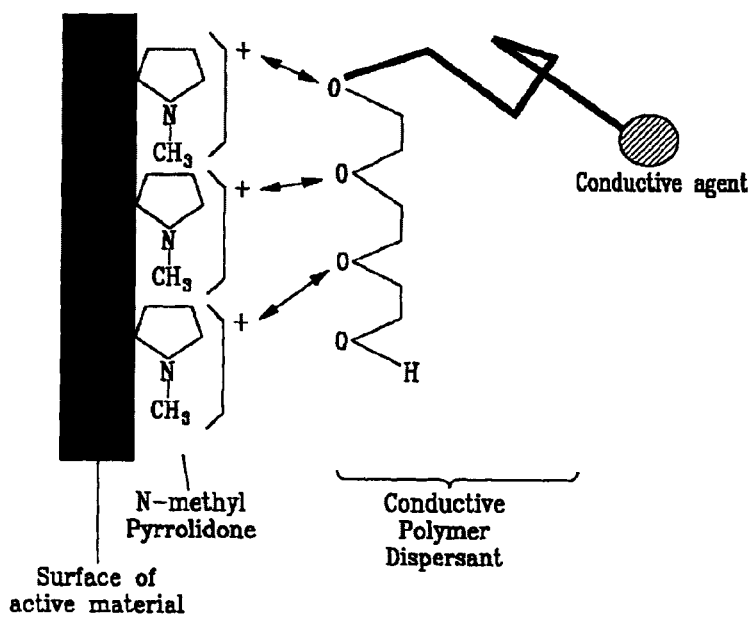
Figure 5A:
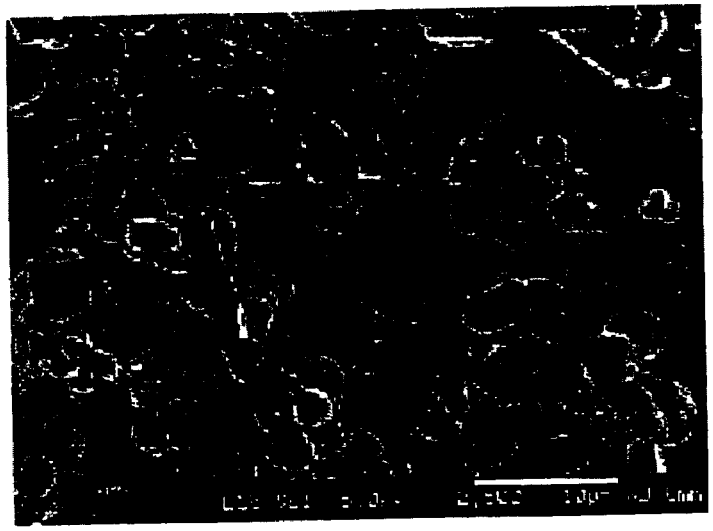
Figure 5B:
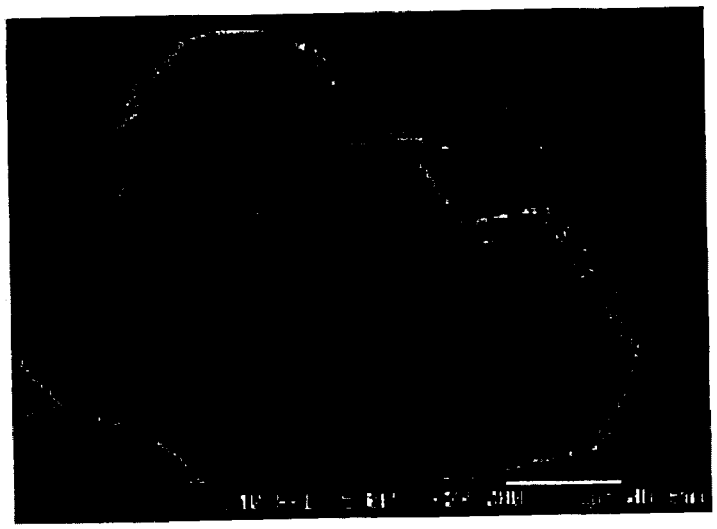
Figure 6A:
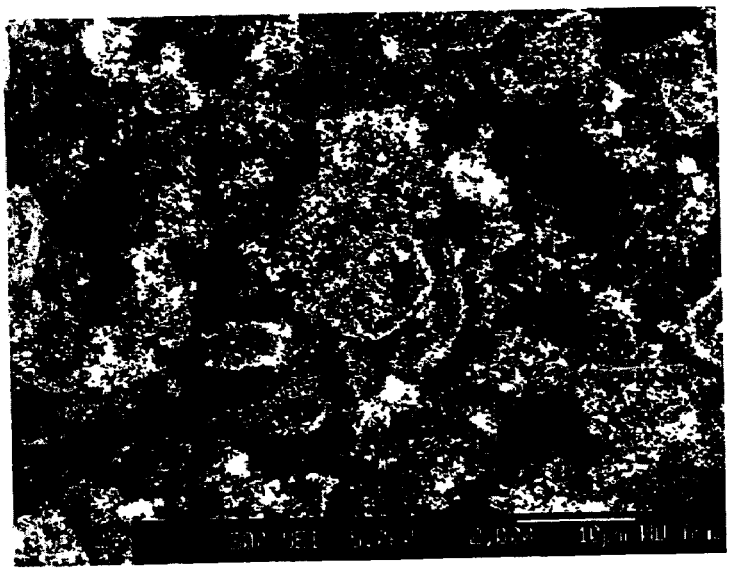
Figure 6B:
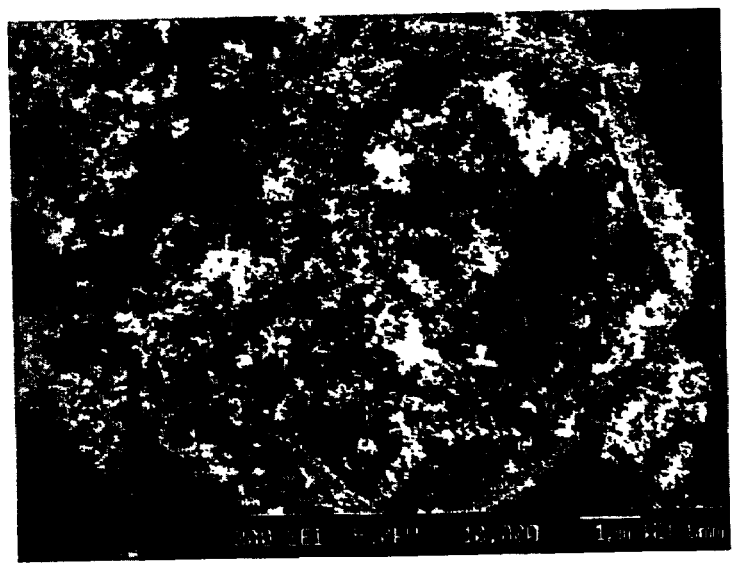
Figure 7A:
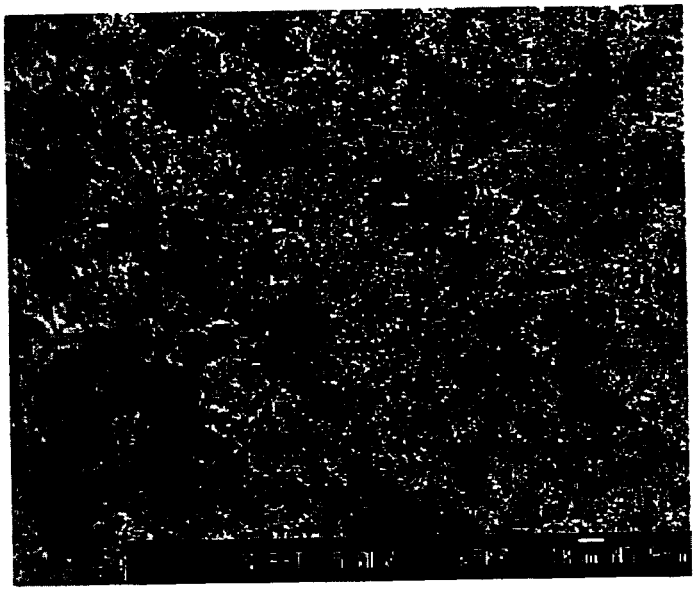
Figure 7B:
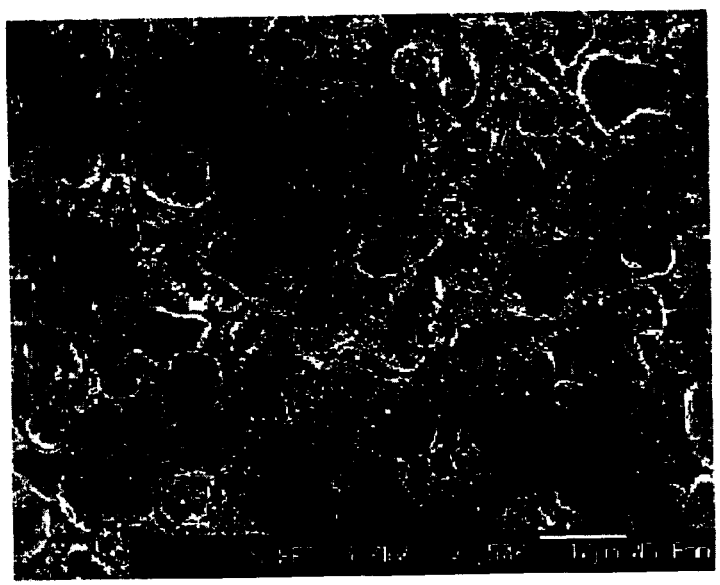
Figure 8A:
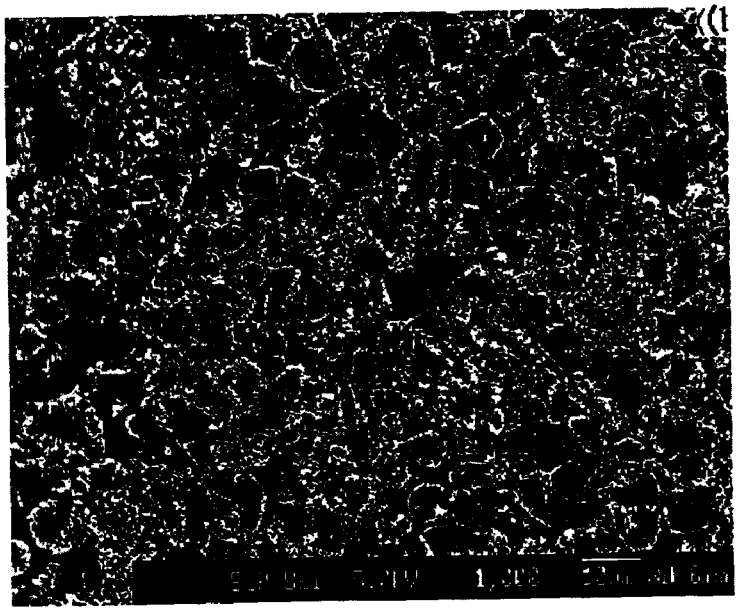
Figure 8B:
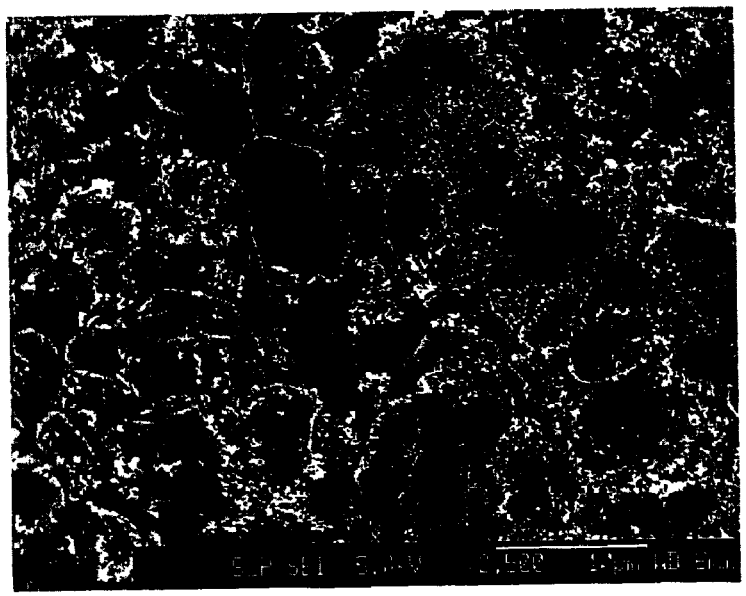
Figure 9A:
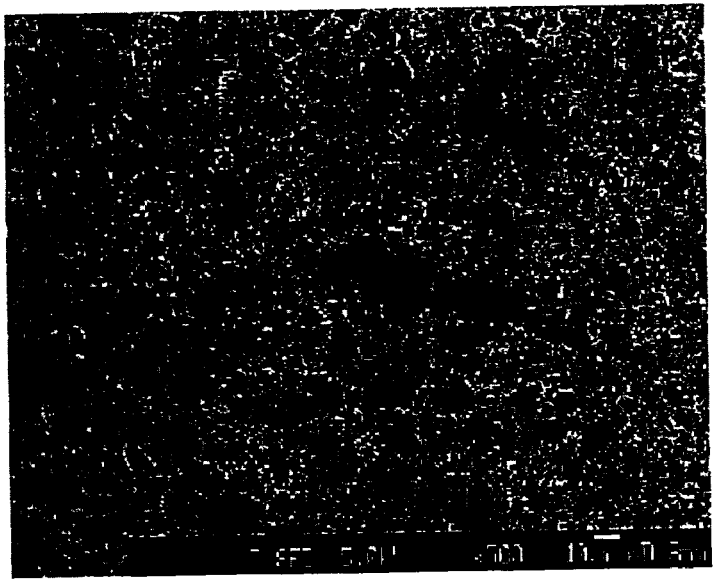
Figure 9B:
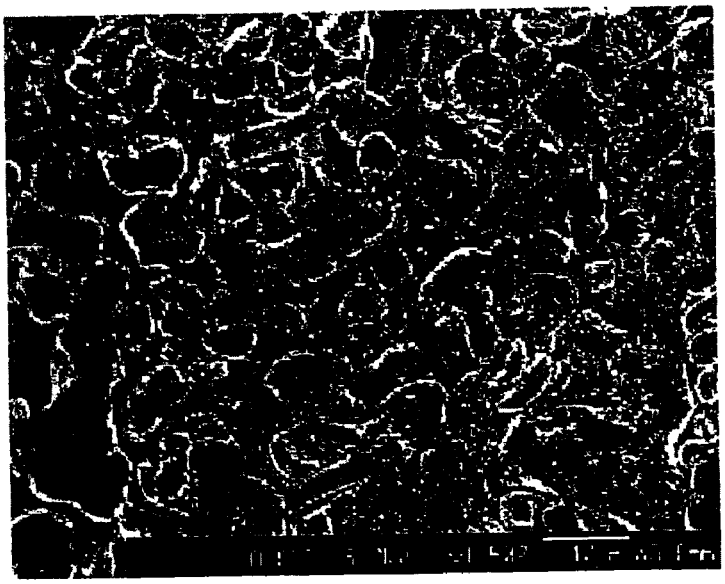
Figure 10:
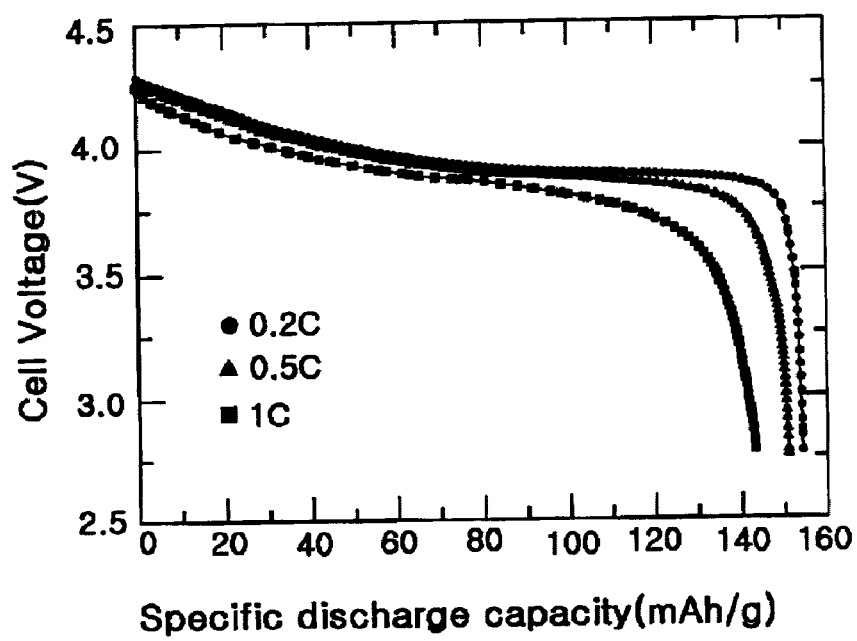
Figure 11:
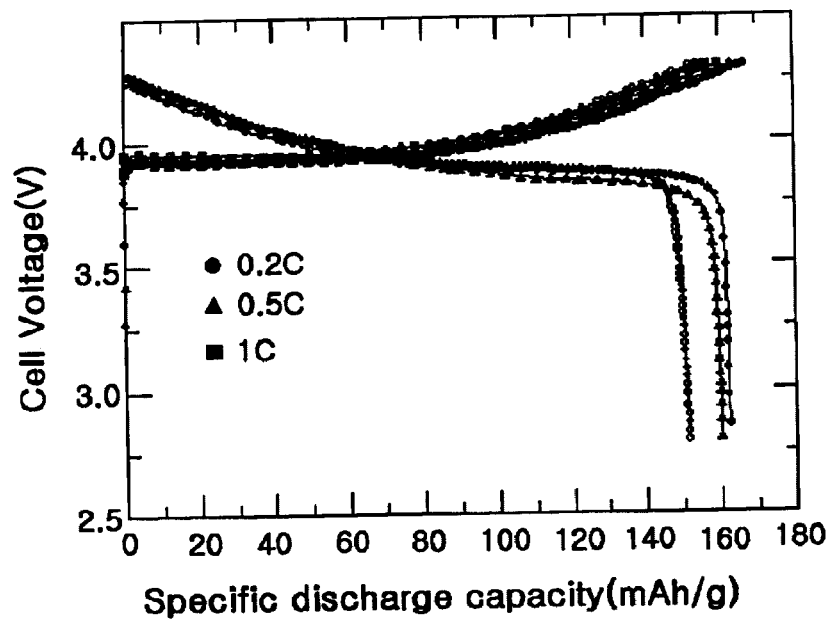
Figure 12:
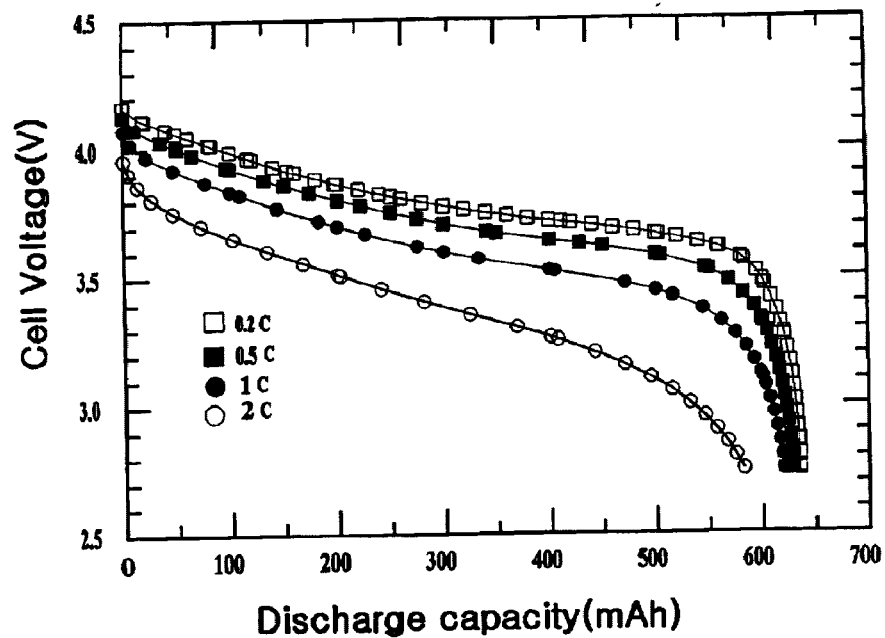
Figure 13:
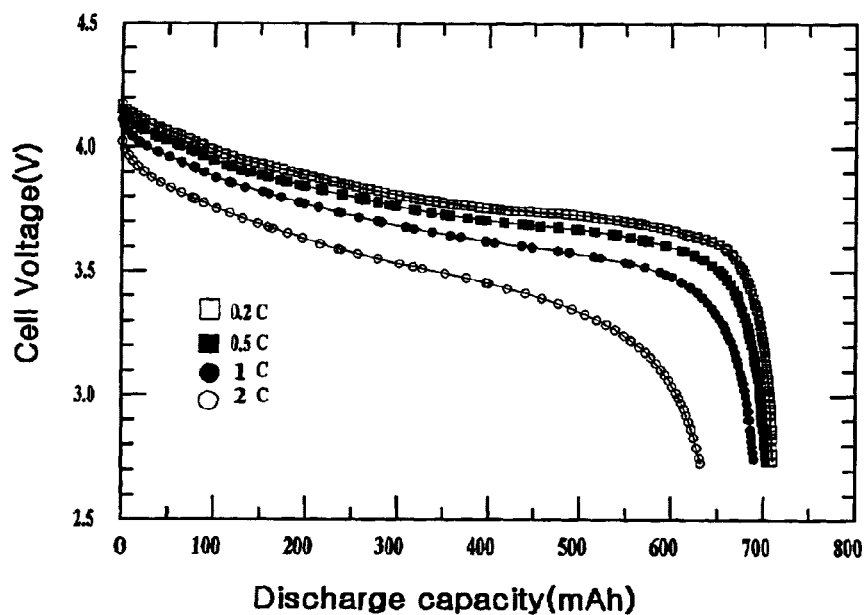
Figure 14:
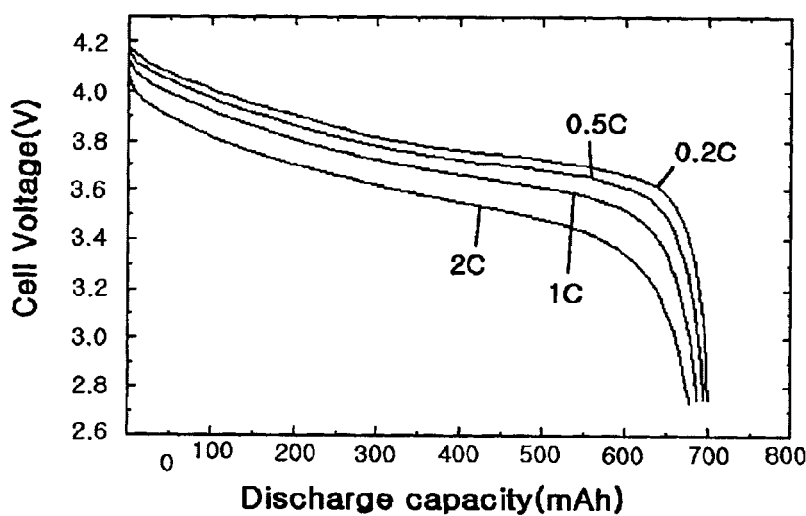
Figure 15:
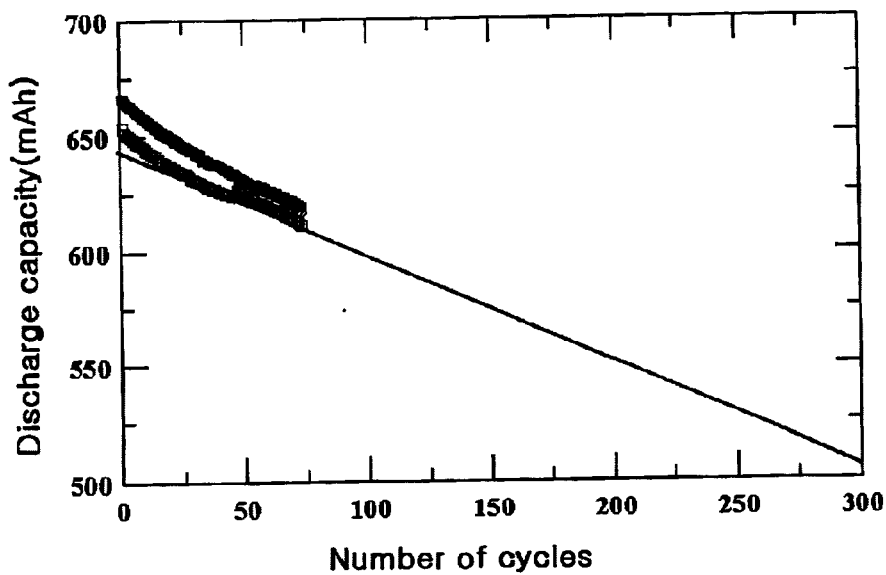

The conventional electrode fabrication process and the inventive electrode fabrication process are illustrated in FIGS. 3A to 3C. As shown in FIG. 3A, in the conventional process, an active material and a conductive agent are put to a binder-containing solution to prepare a slurry, and the slurry is coated onto a current collector followed by pressing to thereby form an electrode. By contrast, as shown in FIG. 3B, in the inventive process, the conductive agent is not added to the active material in preparing the slurry. That is, the active material with a conductive agent-based coating layer is added to a binder-containing solution to prepare a slurry, and the slurry is coated onto a current collector and is pressed to thereby form an electrode. In the inventive electrode, the conductive agent is distributed through the active material more uniformly than in the conventional electrode using uncoated active material. Furthermore, under the application of a conductive polymeric dispersant, as shown in FIG. 3C, the active material coating process can be made during the process of preparing the slurry so that the overall processing steps can be simplified.

Meanwhile, in the electrode fabrication process using the coated active material, the amount of the conductive agent can be reduced without influencing the electrochemical characteristics of the battery cell. Consequently, the addition reaction of the conductive agent with the electrolyte is reduced while decreasing the occurrence of gas in the battery cell. This prohibits swelling of the battery cell while securing safety thereof.

Furthermore, the amount of the binder for reinforcing the binding of the conductive agent to the active material can be reduced together with that of the organic solvent such as N-methyl pyrrolidone for the slurry, decreasing the production cost. The amount of the active material is increased by the amount of reduction of the conductive agent and the binder, resulting in enhanced electrode density. Accordingly, when the inventive active material is employed for use in fabricating a battery cell, the stability of the cell can be improved while maintaining the electrochemical characteristics thereof.

The coated active material bears excellent adhesive strength with respect to the electrode, and hence the resulting battery cell does not suffer an increase in the internal resistance thereof due to possible detachment of the active material during cycling. Accordingly, in the case the electrode is fabricated using the coated active material, suitable adhesive strength can be obtained even with a reduction in the amount of binder.

In the case a conductive polymeric dispersant is used as the surfactant, the active material coated with the mixture of the conductive agent and the conductive polymeric dispersant is added to a binder-containing solution to prepare a slurry. It is also possible that the binder, the conductive agent and the conductive polymeric dispersant are mixed together, and a non-coated active material is added to the mixture to thereby prepare a slurry. In the latter case, as shown in FIG. 3C, the process of coating the conductive agent and the conducting high molecule dispersant onto the active material, and the process of preparing the slurry may be made through one process.

The process of fabricating an electrode using a conductive polymeric dispersant is made through the steps of: (a) preparing a coating liquid where a conductive agent, a conductive polymeric dispersant and a binder are dispersed in a solvent, (b) adding an active material to the coating liquid to prepare a slurry, and (c) coating the slurry onto a current collector and pressing it to thereby form an electrode.

The conductive polymeric dispersant has a property of being well dissolved in the solvent for the electrode fabrication, and further has a role of making the binder be well dissolved in the slurry. It is preferable that the amount of the conductive agent is 0.5 to 5 wt. % of the active material, the amount of the conductive polymeric dispersant is 0.1 to 20 wt. % of the conductive agent, and the amount of the binder is 0.5 to 20 wt. % of the active material.

The following examples further illustrate the present invention.

COMPARATIVE EXAMPLE 1

Polyvinylidene fluoride for a binder was added to N-methyl pyrrolidone to thereby prepare a binder-containing solution. A powder of $LiCoO_2$ with an average particle diameter of 10 $\mu$m for a positive active material, and Super P for a conductive agent were added to the binder-containing solution, and it was mixed for 4 hours. The mixture was then aged for 4 hours to thereby form a slurry. The weight ratio of the positive active material, the conductive agent and the binder was established to be 94/3/3. The slurry was coated onto an Al-foil to a thickness of about 100 $\mu$m and pressed with a pressure of 1 ton to thereby fabricate a positive electrode for a coin cell. The positive electrode was punched to bear a hole with a diameter of 1.6 cm. A coin-type half-cell was fabricated by using this positive electrode and lithium metal as a counter electrode in a glove box. For the electrolyte, 1M $LiPF_6$ solution of mixed solvent of ethylene carbonate and dimethyl carbonate in the volume ratio of 1:1 was used.

COMPARATIVE EXAMPLE 2

A coin-type half-cell was fabricated in the same ways as with Comparative Example 1 except that a powder of $LiMn_2O_4$ having an average particle diameter of 15 $\mu$m was used for the positive active material.

COMPARATIVE EXAMPLE 3

A coin-type half-cell was fabricated in the same way as with Comparative Example 1 except that a powder of $LiNi_{0.9}Sr_{0.002}Co_{0.1}O_2$ having an average particle diameter of 10 $\mu$m was used for the positive active material.

COMPARATIVE EXAMPLE 4

A coin-type half-cell was fabricated in the same way as with Comparative Example 1 except that a powder of $LiNi_{0.68}Mn_{0.25}Al_{0.05}Mg_{0.05}Co_{0.1}O_2$ having an average particle diameter of 10 $\mu$m was used for the positive active material.

COMPARATIVE EXAMPLE 5

A coin-type half-cell was fabricated in the same way as with Comparative Example 1 except that the weight ratio of the positive active material, the conductive agent and the binder was established to be 96/2/2.

EXAMPLE 1

100 ml of water, a 500 g zirconia ball, 3 g of Super P for a conductive agent, and 0.5 g of Orotan™ (produced by the Hanchung Chem company) were poured into a 300 ml plastic bottle, and ball-milled for 2 hours to thereby prepare a solution where the Super P was completely dispersed.

A solution where 1 g of gelatin was dissolved in 200 ml of water was thoroughly mixed, and 100 g of $LiCoO_2$ with an average particle diameter of 10 $\mu$m was added to the solution. The pH of the solution was controlled to be 3 to 4 with the addition of acetic acid. Then, the solution was filtered such that the gelatin not coated on the active material could be removed. Water was again added to the filtered solution while controlling the pH thereof to be 5 to 8. The solution with the completely dispersed Super P was mixed with the pH-controlled solution, and the mixed solution was thoroughly mixed for 5 minutes. Under such a pH condition, the —COO⁻ group in the gelatin makes hydrogen bonding with the —OH group in the Super P. After mixing, the Super P-coated $LiCoO_2$ was settled down such that it could be easily recovered. The solution was dried at 130° C., and baked at 300° C. for 10 minutes so that the gelatin content was completely removed from the $LiCoO_2$. As a result, a powder of $LiCoO_2$ coated with 0.5 wt. % of Super P is coated was produced. A binder-containing solution was prepared through mixed polyvinylidene fluoride for a binder with N-methyl pyrrolidone (NMP), and the $LiCoO_2$ powder was added to the binder-containing solution to thereby prepare a slurry. The weight ratio of the active material to the binder was established to be 99/1, and the Super P was not added thereto. The slurry was coated onto an Al-foil to a thickness of about 200 $\mu$m and pressed with a pressure of 1 ton to thereby fabricate a positive electrode for a coin cell. The positive electrode was punched to bear a hole with a diameter of 1.6 cm. A coin-type half-cell was fabricated by using this positive electrode and lithium metal as a counter electrode in a glove box. For the electrolyte, 1M $LiPF_6$ solution of mixed solvent of ethylene carbonate and dimethyl carbonate in the volume ratio of 1:1 was used.

In the case the slurry was prepared using the positive active material of Comparative Example 1, the time period for mixing the slurry reached 4 or more hours because the diffusion of the active material and the conductive agent was not easily made. By contrast, in the case the slurry was prepared using the positive active material of Example 1, the time period for mixing the slurry was significantly reduced while the diffusion of the active material and the conductive agent was made in a uniform manner. The time period for fabricating the electrode becomes shortened while enhancing the cell production efficiency.

EXAMPLE 2

A coin-type half-cell was fabricated in the same way as with Example 1 except that the amount of gelatin was 2 g.

EXAMPLE 3

A coin-type half-cell was fabricated in the same way as with Example 1 except that the amount of gelatin was 3 g.

EXAMPLE 4

Figure 4:
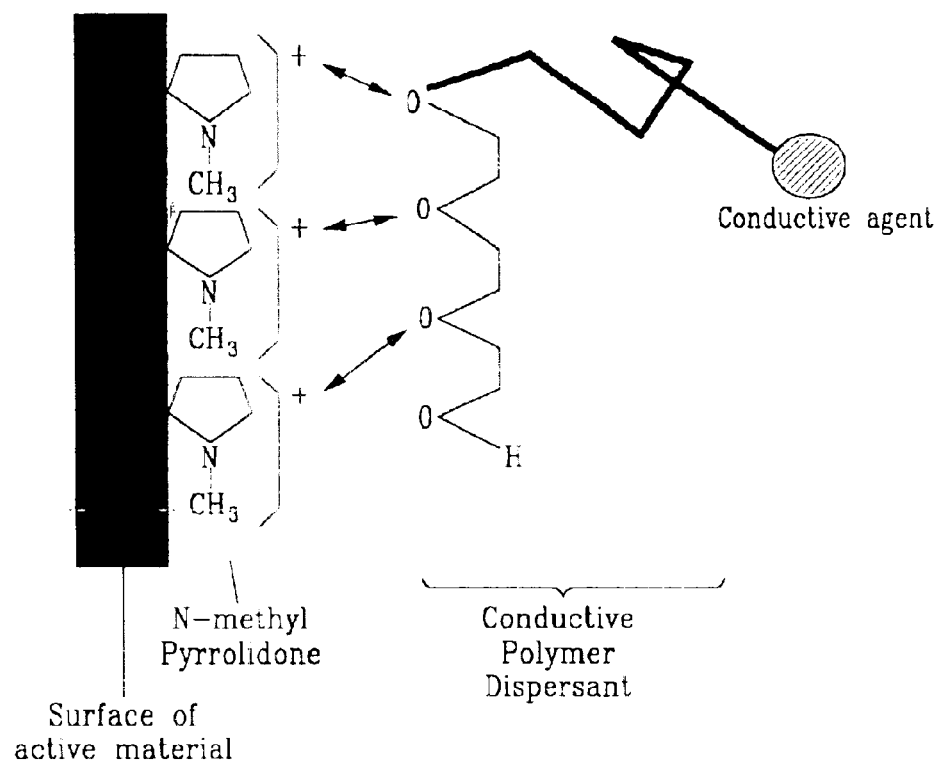
FIG. 4 illustrates the combination state of a conductive polymeric dispersant and N-methyl pyrrolidone existent on the surface of an active material.

A block copolymer of $(EO)_l(PO)_m(EO)_l$ (pluronic series ™ of the BASF company), and Super P were put into N-methyl pyrrolidone, and ball-milled for 6 hours. Polyvinylidene fluoride was added to the mixture, and $LiCoO_2$ with an average particle diameter of 10 μm was added thereto as an active material to thereby prepare a slurry. The oxygen content of the group of EO in the block copolymer was well bonded to the positive (+) charge of the N-methyl pyrrolidone attached to the active material. For this reason, the Super P attached to the PO group is well coated onto the surface of the $LiCoO_2$. This process is schematically illustrated in FIG. 4. The weight ratio of the active material, the Super P and the polyvinylidene fluoride in the slurry was established to be 97:1:2. The amount of the block copolymer of $(EO)_l(PO)_m(EO)_l$ was 50 wt. % of the Super P. The slurry was coated onto an Al-based foil to a thickness of about 200 μm and pressed with a pressure of 1 ton to thereby fabricate a positive electrode for a coin cell. The positive electrode was punched to bear a hole with a diameter of 1.6 cm. A coin-type half-cell was fabricated by using this positive electrode and lithium metal as a counter electrode in a glove box. For the electrolyte, 1M $LiPH_6$ solution of mixed solvent of ethylene carbonate and dimethyl carbonate in the volume ratio of 1:1 was used.

EXAMPLE 5

A coin-type half-cell was fabricated in the same way as with Example 1 except that a powder of $LiMn_2O_4$ with the average particle diameter of 15 μm was used instead of the powder of $LiCoO_2$.

EXAMPLE 6

A coin-type half-cell was fabricated in the same way as with Example 4 except that a powder of $LiMn_2O_4$ with an average particle diameter of 15 μm was used instead of the powder of $LiCoO_2$.

EXAMPLE 7

A coin-type half-cell was fabricated in the same way as with Example 1 except that a powder of $LiNi_{0.9}Sr_{0.002}Co_{0.1}O_2$ with an average particle diameter of 10 μm was used instead of the powder of $LiCoO_2$.

EXAMPLE 8

A coin-type half-cell was fabricated in the same way as with Example 4 except that a powder of $LiNi_{0.9}Sr_{0.002}Co_{0.1}O_2$ with an average particle diameter of 10 μm was used instead of the powder of $LiCoO_2$.

EXAMPLE 9

A coin-type half-cell was fabricated in the same way as with Example 1 except that a powder of $LiNi_{0.66}Mn_{0.25}Al_{0.05}Mg_{0.05}Co_{0.1}O_2$ with an average particle diameter of 10 μm was used instead of the powder of $LiCoO_2$.

EXAMPLE 10

A coin-type half-cell was fabricated in the same way as with Example 4 except that a powder of $LiNi_{0.66}Mn_{0.25}Al_{0.05}Mg_{0.05}Co_{0.1}O_2$ with an average particle diameter of 10 μm was used instead of the powder of $LiCoO_2$.

EXAMPLE 11

A coin-type half-cell was fabricated in the same way as with Example 1 except that tin oxide ($SnO_2$) was used for the active material.

EXAMPLE 12

A coin-type half-cell was fabricated in the same way as with Example 4 except that $SnO_2$ was used for the active material.

EXAMPLE 13

A coin-type half-cell was fabricated in the same way as with Example 1 except that silicon (Si) was used for the active material.

EXAMPLE 14

A coin-type half-cell was fabricated in the same way as with Example 4 except that silicon (Si) was used for the active material.

EXAMPLE 15

10 g of a graphite powder and 0.1 g of phosphoric acid ester (degressal™ SD40 produced by the BASF company) were added to alcohol. As the graphite powder bears a hydrophobic property, the hydrophobic groups in the phosphate were bonded thereto. $AlCl_3$ was added to the solution such that $Al_3^+$ ions could be bonded to the hydrophilic head groups of the phosphate by way of static electricity bonding. The resulting solution was filtered, and baked at 300° C. to thereby obtain a graphite powder where mesoporous $AlPO_4$ was uniformly coated on the surface thereof. A coin-type half-cell was fabricated using the graphite powder.

Figure 5A:
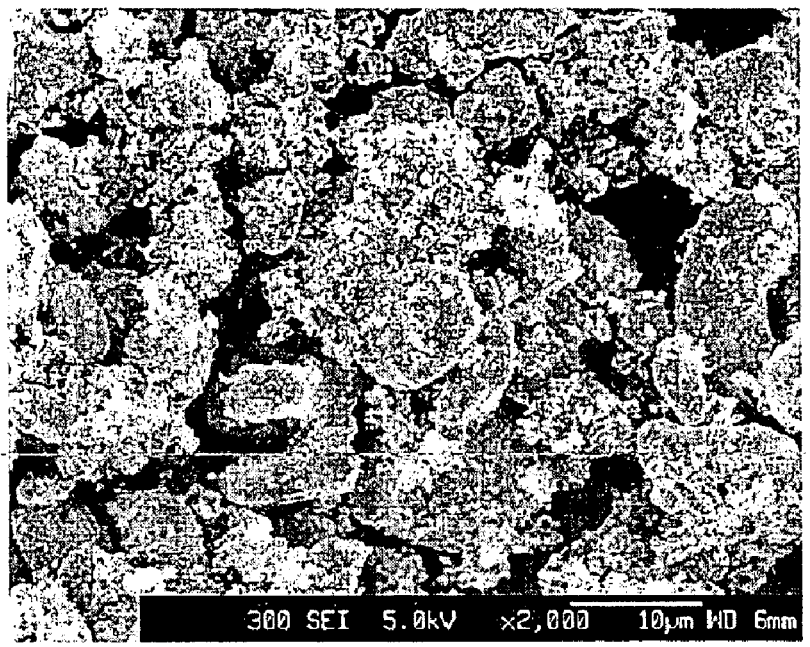
FIGS. 5A and 5B are Scanning Electron Microscopy (SEM) photographs of a positive active material powder according to Comparative Example 1.
Figure 5B:
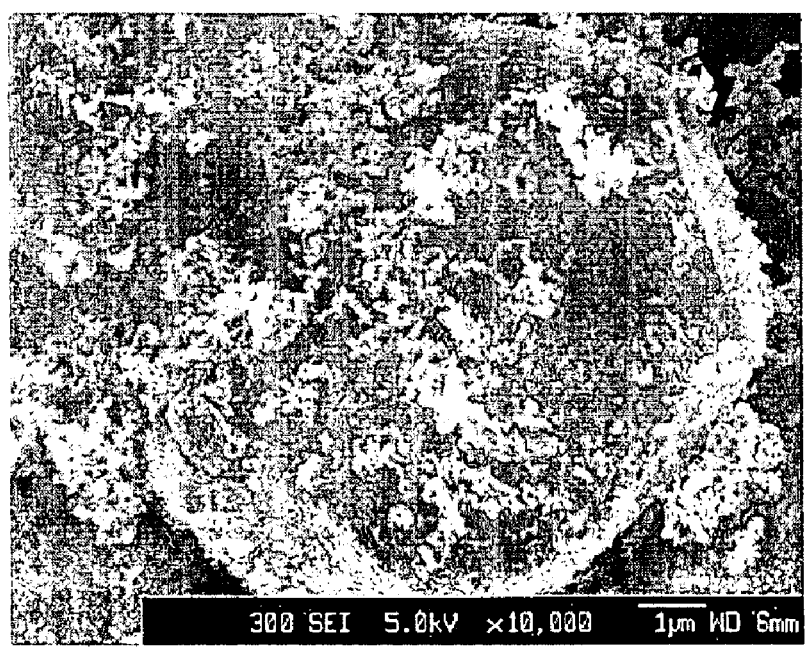
Figure 6A:
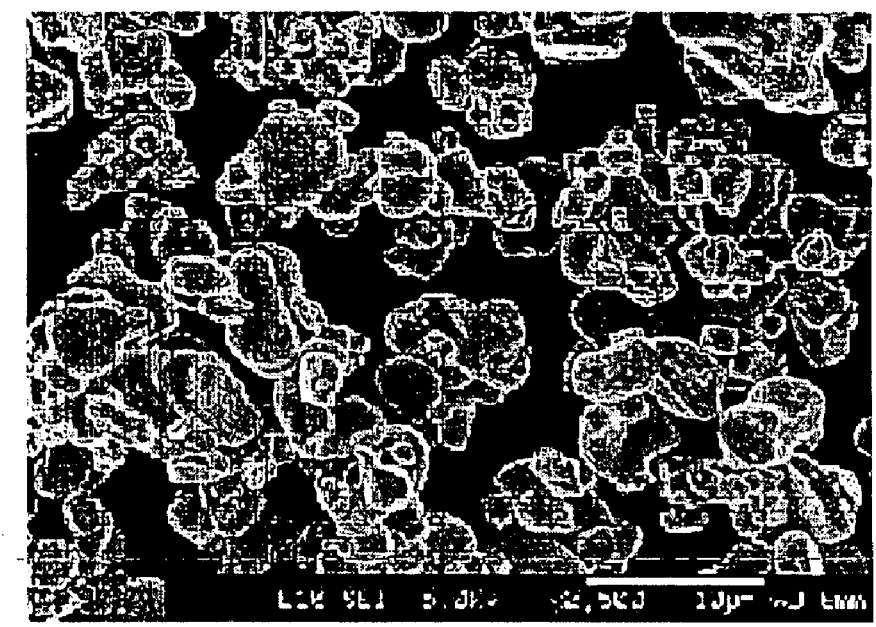
FIGS. 6A and 6B are SEM photographs of a positive active material powder according to Example 1.
Figure 6B:
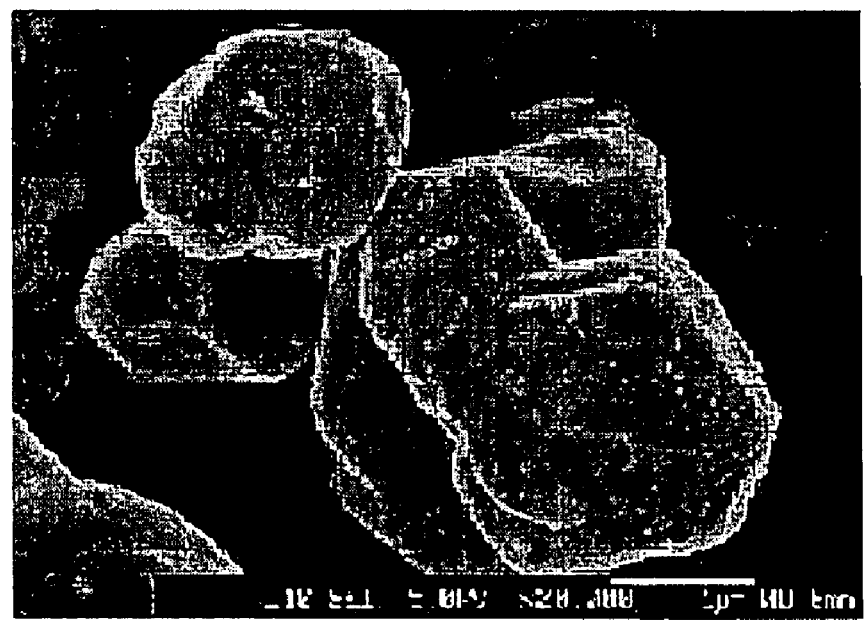

FIGS. 5A and 5B are SEM photographs of the non-coated $LiCoO_2$ powder according to Comparative Example 1. FIGS. 6A and 6B are SEM photographs of the $LiCoO_2$ powder coated with the Super P-based conductive agent according to Example 1. It can be verified from the photographs that the powder according to Example 1 has a surface shape entirely different from that according to Comparative Example 1.

Figure 7A:
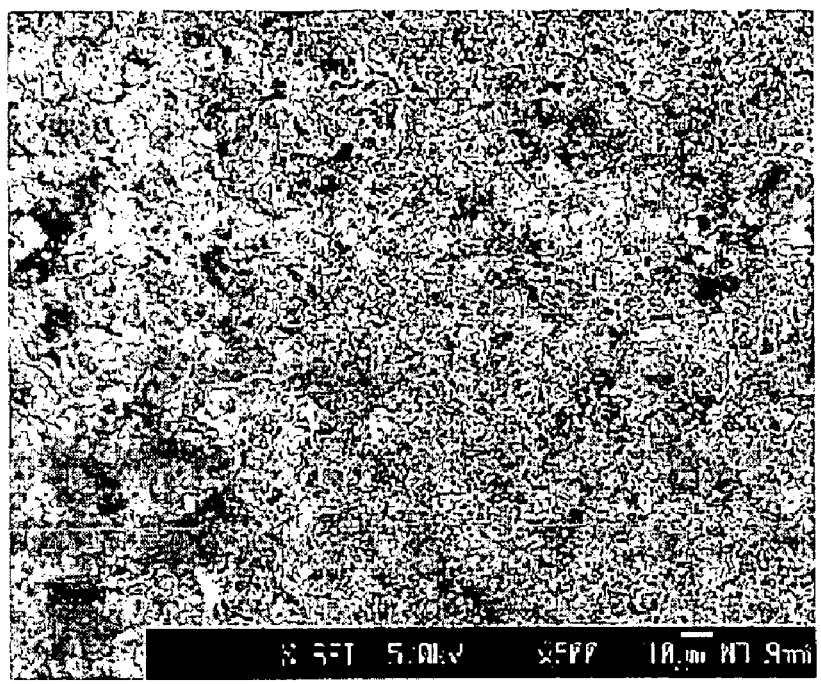
FIGS. 7A and 7B are SEM photographs of an electrode according to Comparative Example 1.
Figure 7B:
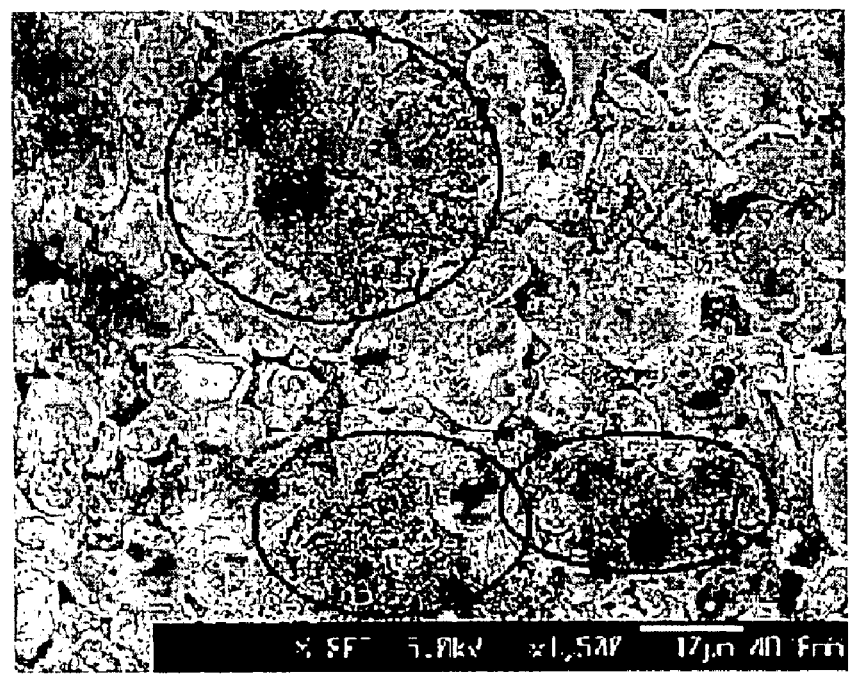
Figure 8A:
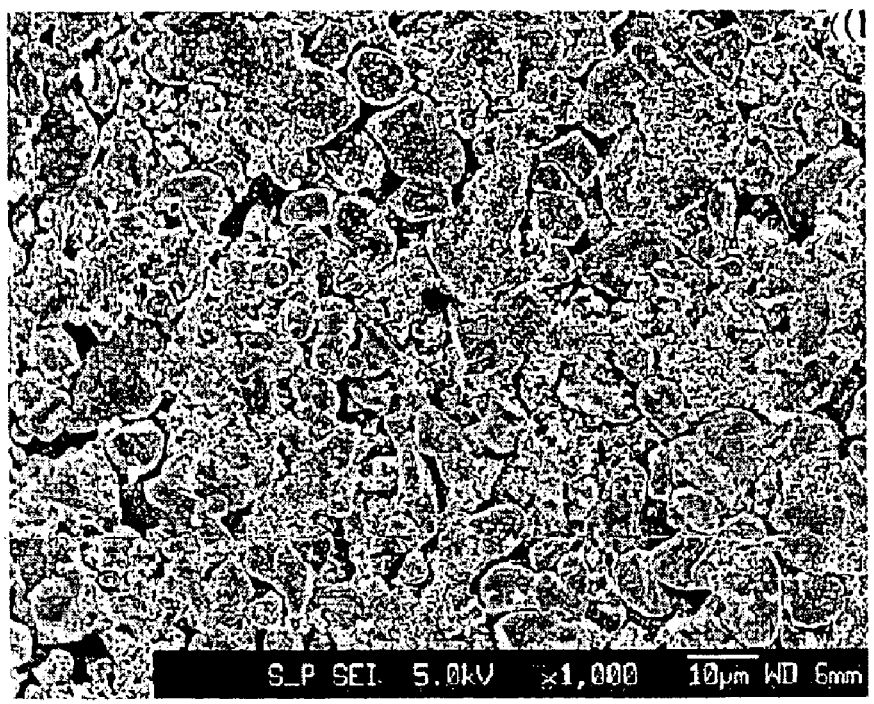
FIGS. 8A and 8B are SEM photographs of an electrode according to Example 1.
Figure 8B:
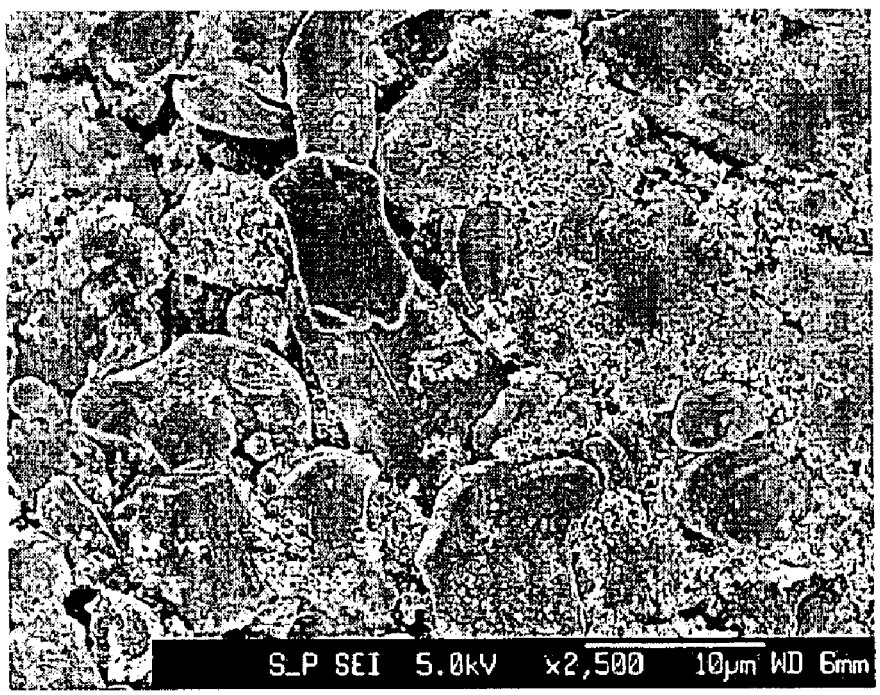
Figure 9A:
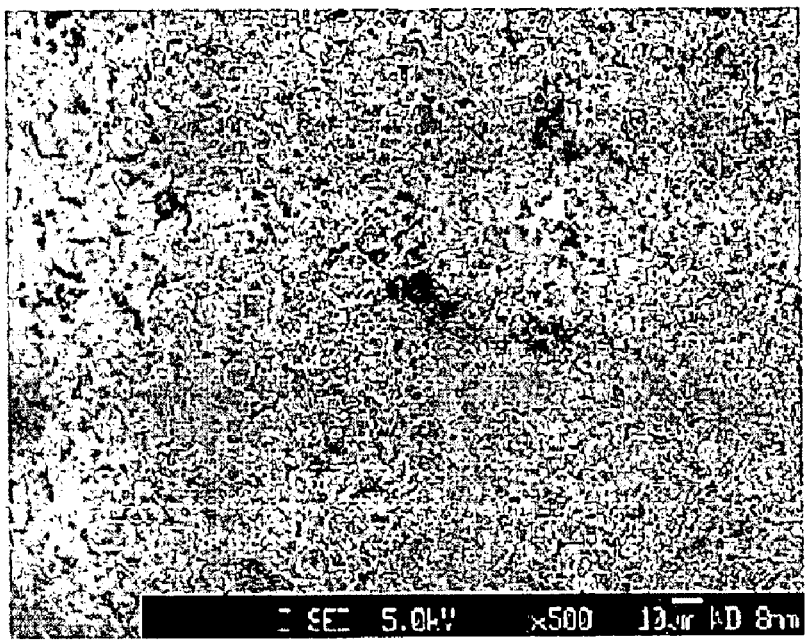
FIGS. 9A and 9B are SEM photographs of an electrode according to Example 2.
Figure 9B:
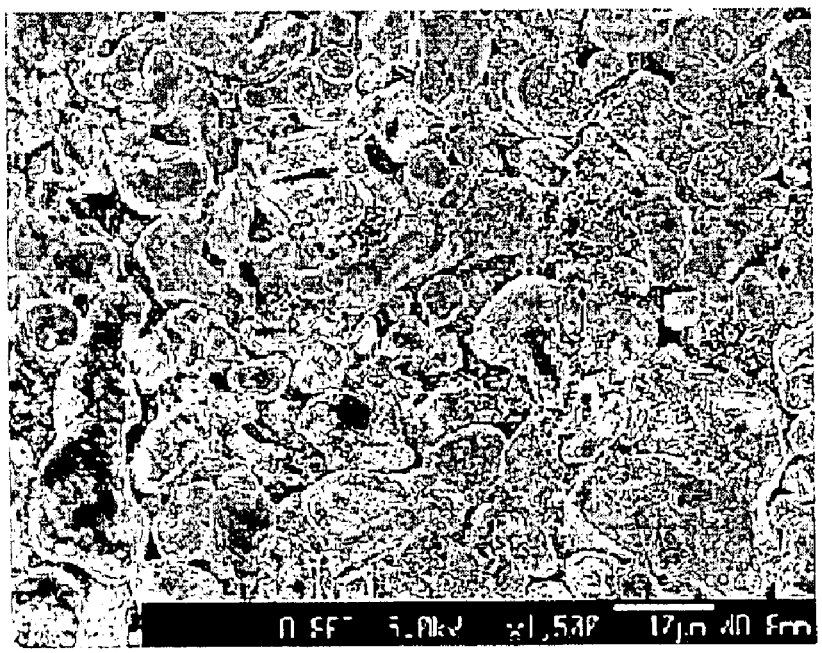

FIGS. 7A, 8A and 9A are SEM photographs of the electrodes according to Comparative Example 1, and Examples 1 and 2, and FIGS. 7B, 8B and 9B are amplified photographs of those electrodes. In the electrode according to Comparative Example 1, it can be observed from the SEM photograph of FIG. 7A that the Super P is not existent on the active material, but it fills the empty portions of the electrode in a separate manner. However, in the electrodes according to Examples 1 and 2, it can be noticed from the SEM photographs of FIGS. 8A and 9A that the Super P is coated on the active material while being distributed in a uniform manner.

The amount of conductive agent in the electrodes according to Examples 1 to 3 (based on the electrode) and Comparative Example 1 and the density of the active material therein were computed, and the results are shown in Table 1.

TABLE 1

|  | Example 1 | Example 2 | Example 3 | Comparative Example 1 |
|---|---|---|---|---|
| Amount of conductive agent (wt %) | 0.15 | 0.3 | 0.5 | 3 |
| Density of active material (mg/cm$^2$) | 47 | 44 | 42 | 32 |

The density of the active material in the electrodes according to Examples 1 to 3 was increased by 30 to 40% compared to that according to Comparative Example 1. Therefore, it can be predicted that the density of the electrode would be also increased by 30 to 40%.

Figure 10:
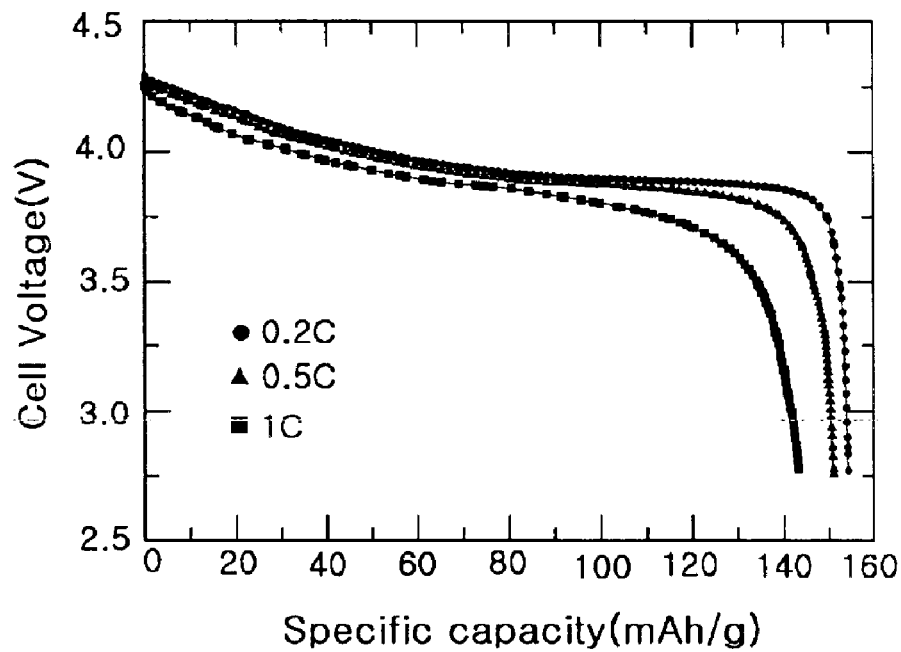
FIG. 10 is a graph illustrating the charge and discharge curves of a half-cell according to Comparative Example 1.
Figure 11:
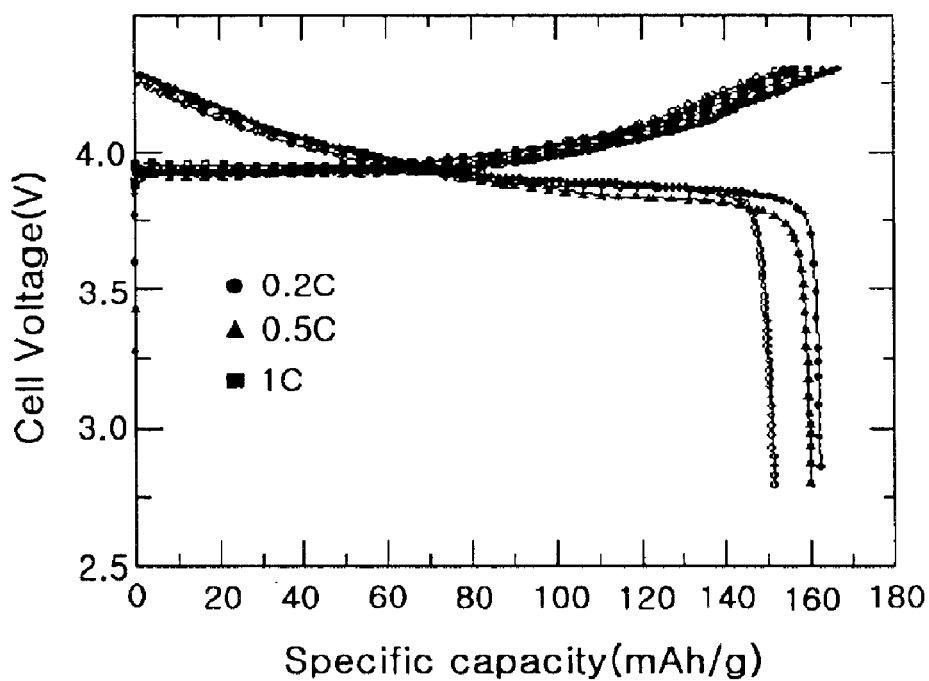
FIG. 11 is a graph illustrating the discharge capacity characteristic of a half-cell according to Example 1.

The coin-type half-cell according to Comparative Example 1 was charged and discharged at 0.2 C, 0.5 C and 1 C rates in the voltage range of 2.75 to 4.3 V, and the results are illustrated in FIG. 10. It can be observed from FIG. 10 that the cell capacity at the 1 C rate is radically deteriorated. Likewise, the cell according to Example 1 was charged and discharged, and the discharge characteristics thereof are illustrated in FIG. 11. It can be observed from the drawing that the discharge potential of the cell at the 1 C rate is approximated to that at the 0.2 C rate. Furthermore, the discharge capacity at the 1 C rate after the 40 cycling was decreased at most by 1% compared to the initial discharge capacity.

Prismatic lithium ion cells including the positive active materials of Examples and Comparative Examples were fabricated, and the capacity characteristics thereof pursuant to C-rates were measured. The lithium ion cell was fabricated in the following way. A positive active material, and polyvinylidene fluoride for a binder were mixed in the weight ration of 98/2 to thereby prepare a slurry. The slurry was coated onto an Al-foil and pressed to thereby fabricate a positive electrode. Synthetic graphite for a negative active material and polyvinylidene fluoride for a binder were mixed in the weight ratio of 90/10 to thereby prepare a slurry. The slurry was coated onto a Cu-foil, and pressed to thereby fabricate a negative electrode. The negative and the positive electrodes were combined with each other, and an electrolyte was injected between them to thereby fabricate a 700 mAh prismatic lithium ion cell. For the electrolyte, 1 M LiPF$_6$ solution of mixed solvent of ethylene carbonate and dimethyl carbonate in the volume ratio of 1:1 was used.

Figure 12:
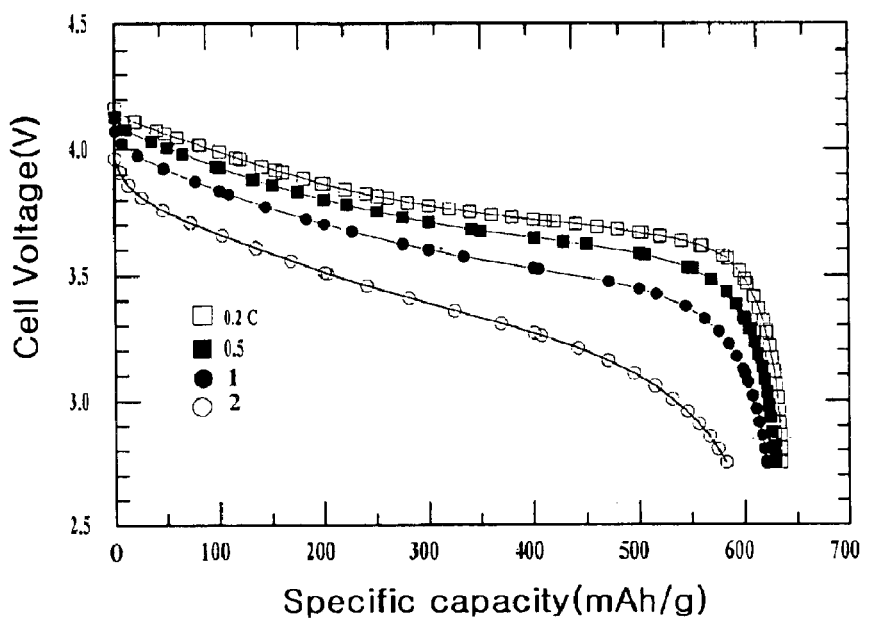
FIG. 12 is a graph illustrating the discharge capacity characteristic of a lithium ion battery cell with a positive active material according to Comparative Example 1.
Figure 13:
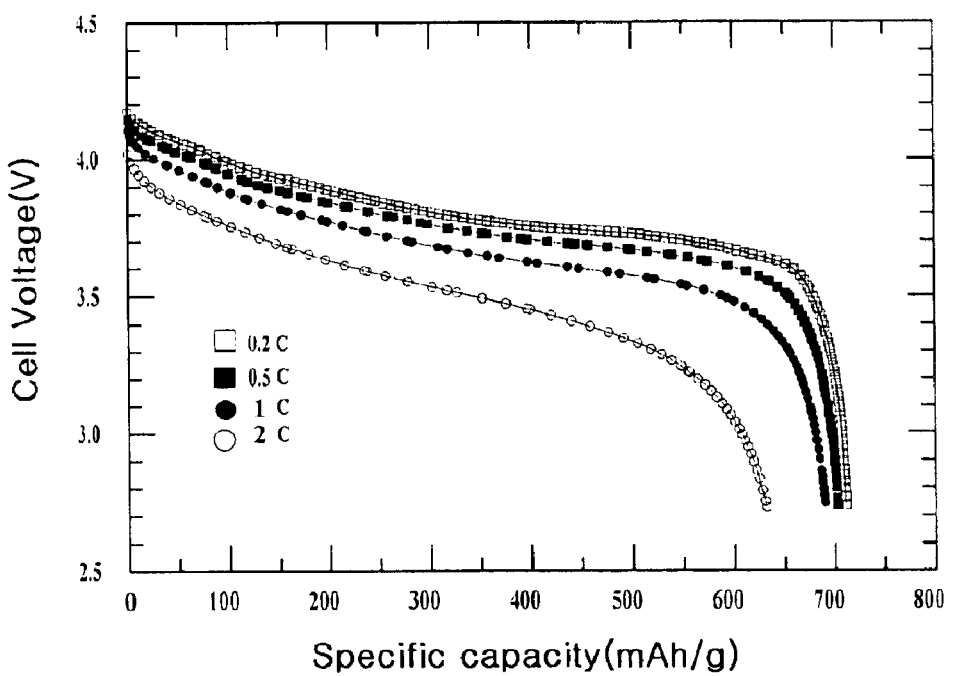
FIG. 13 is a graph illustrating the discharge capacity characteristic of a lithium ion battery cell with a positive active material according to Example 1.

The capacity characteristics of the prismatic lithium ion cell including the positive active material of Comparative Example 1 pursuant to the C-rates were measured, and the results are illustrated in FIG. 12. It can be observed from the drawing that the discharge potential of the cell at the 2 C rate is significantly reduced compared to that at the 1 C rate. The capacity characteristics of the lithium ion cell including the positive active material of Example 1 pursuant to the C rates were measured, and the results are illustrated in FIG. 13. It can be observed from FIG. 13 that the battery cell exhibited 97% of the initial capacity even at the 2 C rate. In the lithium ion cell including the positive active material of Example 4, the capacity characteristics thereof pursuant to the C-rates were measured, and the results are listed in FIG. 14. As shown in the drawing, the cell capacity exhibited 90% of the initial capacity even at the 2 C rate. Furthermore, the discharge potential at the 2 C rate was not reduced much as compared to that at the 1 C rate. This is because the conductive agent is coated on the surface of the active material while reducing the internal resistance thereof.

Figure 15:
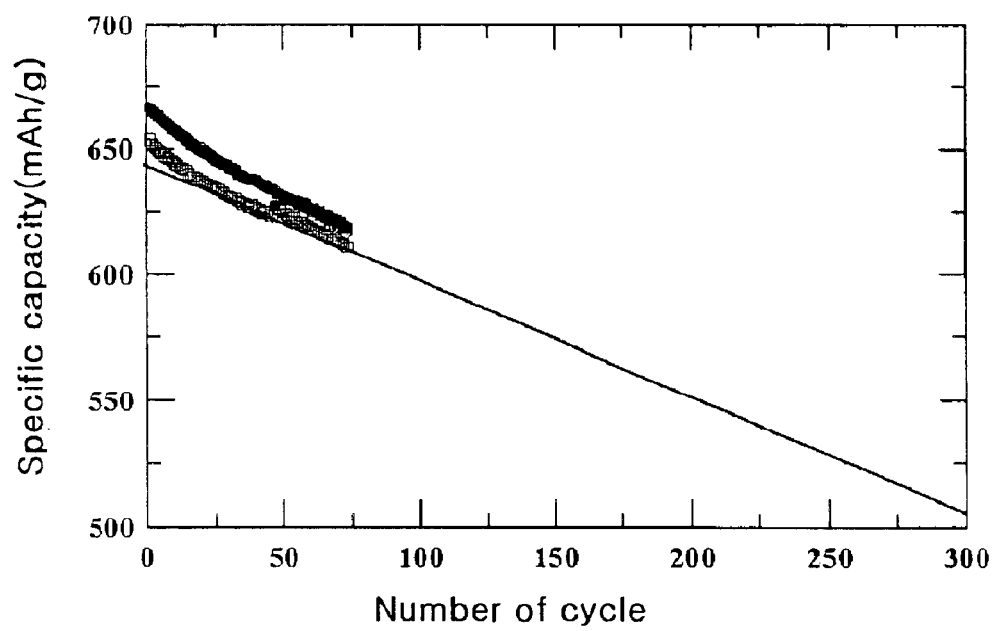
FIG. 15 is a graph illustrating the cycle life characteristic of lithium ion battery cells with a positive active material according to Example 1.
Figure 1A:
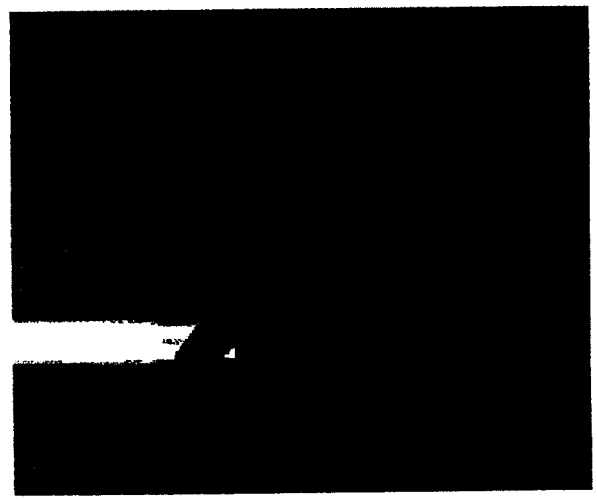
Figure 1B:
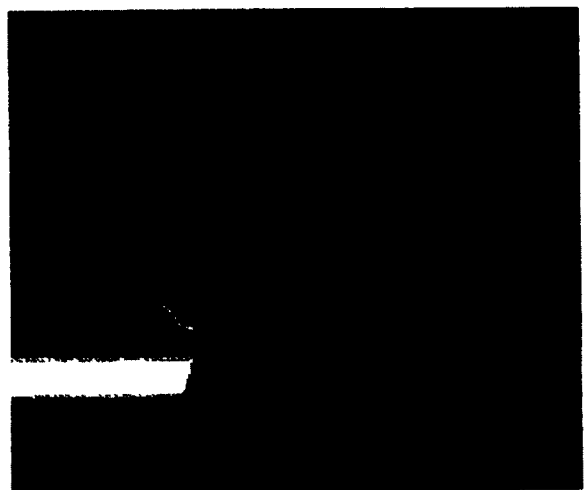

Two prismatic lithium ion cells were fabricated based on the positive active material of Example 1, and the cycle life characteristics thereof at the 1 C rate were measured. The results are illustrated in FIG. 15. In the drawing, the diagonal line indicates the maintenance of the cycle life of 80%. It turned out that the cells after the 300 cycling proceed along the 80% cycle life maintenance line.

As described above, the invention active material is coated with a conductive agent or a mixture of a conductive agent and a conductive polymeric dispersant, and hence involves improved capacity, cycle life, and safety. Furthermore, the active material bears a good adhesion characteristic to the electrode, so the resulting battery cell does not suffer an increase in internal resistance thereof due to detachment of the active material.

An electrode with the active material and the conductive agent uniformly distributed can be fabricated using the coated active material so that the electrochemical characteristics of the resulting battery cell can be improved.

The inventive active material preparation technique involves a reduced processing time compared to other techniques. Furthermore, in this technique, the amount of conductive agent, binder and slurry solvent can be reduced in a cost-effective manner while enhancing production efficiency.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An active material for use in an electrode in a battery, comprising:
   a material that can undergo oxidation-reduction reactions; and
   a coating on said material, said coating including one of a mixture of a conductive agent and a dispersant and another mixture of the conductive agent and a conductive polymeric dispersant, wherein the conductive polymeric dispersant is at least ionically conductive.

2. The active material of claim 1, wherein said material comprises one of a metal, a lithium-containing alloy, a sulfur-based compound, compounds that reversibly forms lithium-coating compounds by a reaction with lithium ions, and a lithiated intercalation compound that reversibly intercalate/deintercalate the lithium ions.

3. The active material of claim 2, wherein said material comprises the metal, and the metal includes one of lithium, tin, and titanium.

4. The active material of claim 2, wherein said material comprises the lithium-containing alloy, and the lithium-containing alloy includes one of a lithium/aluminum alloy, a lithium/tin alloy, and a lithium/magnesium alloy.

5. The active material of claim 2, wherein said material comprises the lithiated intercalation compound includes, and the lithiated intercalation compound includes one of a carbon-based material, a lithium-containing metal oxide, and a lithium-containing compound.

6. The active material of claim 5, wherein the lithiated intercalation compound comprises the carbon-based material, and the carbon-based material includes one of an amorphous carbon, a crystalline carbon, and a mixture thereof.

7. The active material of claim 5, wherein the lithiated intercalation compound comprises the lithium-containing compound, and an average diameter of the lithium-compound in particulate form is in a range of 1 to 50 $\mu$m.

8. The active material of claim 7, wherein the average diameter is in a range of 5 to 20 $\mu$m.

9. The active material of claim 8, wherein the average diameter is in a range of 5 to 10 $\mu$m.

10. The active material of claim 5, wherein:
the lithium-containing metal oxide and the lithium-containing chalcogenide compounds have one of monoclinic, hexagonal and cubic structures as basic structures.

11. The active material of claim 2, wherein:
said material comprises the lithiated intercalation compound, and
the lithiated intercalation compound includes one of $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_g$, $Li_xNi_{1-y-z}Co_yM'_{zy}O_{2-o}X_o$, $Li_xNi_{1-y-z}Mn_yM'_zA_o$, and $Li_xNi_{1-y-z}Mn_yM'_zO_{2-o}X_o$;
$0.95 \leq x \leq 1.1$, $0 \leq y \leq 0.5$, $0 \leq z \leq 0.5$, $0 \leq a \leq 2$;
M' is at least one element selected from the group consisting of Al, Ni, Co, Mn, Cr, Fe, Mg, Sr, V, and a rare-earth element;
A is at least one element selected from the group consisting of O, F, S and P; and
X is at least one element selected from the group consisting of F, S and P.

12. The active material of claim 1, wherein the conductive agent includes one of a carbon-based conductive agent, a graphite-based conductive agent, a metal-based conductive agent, and a metallic compound-based conductive agent.

13. The active material of claim 1, wherein an amount of the conductive agent in said coating is in a range of 0.1 to 10 wt. % of said material.

14. The active material of claim 13, wherein the amount of the conductive agent in said coating is in a range of 1 to 4 wt. % of said material.

15. The active material of claim 1, wherein an average particle diameter of the conductive agent in particulate form in said coating is 1 $\mu$m or less.

16. The active material of claim 1, wherein the coating comprises the another mixture of the conductive agent and the conductive polymeric dispersant, and the conductive polymeric dispersant is selected from:
a polypropylene oxide,
a polyethylene oxide,
a block copolymer of $(EO)_l(PO)_m(EO)_l$ where EO indicates ethylene oxide, PO indicates propylene oxide, and l and m are in the numerical range of 1 to 500,
a polyvinyl chloride (PVC),
an acrylonitrile/butadiene/styrene (ABS) polymer,
an acrylonitrile/styrene/acrylester (ASA) polymer,
a mixture of the ABS polymer and propylene carbonate,
a styrene/acrylonitrile (SAN) copolymer, and
a methylmethacrylate/acrylonitrile/butadiene/styrene (MABS) polymer.

17. The active material of claim 16, wherein an amount of the conductive polymeric dispersant is in a range of 0.1 to 20 wt. % of the conductive agent.

18. The active material of claim 1, wherein the coating comprises the mixture of the conductive agent and the dispersant, and the dispersant is selected from:
a polyacrylate-based resin;
polyethylene oxide;
a block copolymer of $(EO)_l(PO)_m(EO)_l$ where EO indicates oxide, PO indicates propylene oxide, and l and m are in the numerical range of 1 to 500;
a polyvinyl chloride (PVC);
an acrylonitrile/butadiene/styrene (ABS) polymer, an acrylonitrile/styrene/acrylester (ASA) polymer;
a mixture of the ABS polymer and propylene carbonate;
a styrene/acrylonitrile (SAN) copolymer; and
a methylmethacrylate/acrylonitrile/butadiene/styrene (MABS) polymer.

19. An active material for use in an electrode in a battery, comprising:
a material that can undergo oxidation-reduction reactions; and
a coating on said material, said coating including one of a conductive agent and a mixture of the conductive agent and a conductive polymeric dispersant,
wherein:
the conductive polymeric dispersant is at least ionically conductive,
said material comprises one of a metal, a lithium-containing alloy, a sulfur-based compound, compounds that reversibly forms lithium-containing compounds by a reaction with lithium ions, and a lithiated intercalation compound that reversibly intercalate/deintercalate the lithium ions,
said material comprises the sulfur-based compound, and
the sulfur-based compound includes one of a sulfur element, $Li_2S_n (n \geq 1)$, an organic sulfur compound, and a carbon-sulfur polymer $((C_2S_x)_n$ where x=2.5 to 50 and $n \geq 2$).

20. An active material for use in an electrode in a battery, comprising:
a material that can undergo oxidation-reduction reactions; and
a coating on said material, said coating including one of a conductive agent and a mixture of the conductive agent and a conductive polymeric dispersant,
wherein:
the conductive polymeric dispersant is at least ionically conductive,
said material comprises one of a metal, a lithium-containing alloy, a sulfur-based compound, compounds that reversibly forms lithium-containing compounds by a reaction with lithium ions, and a lithiated intercalation compound that reversibly intercalate/deintercalate the lithium ions,
said material comprises the compound that reversibly forms the lithium-containing compound by the reaction with the lithium ions, and
the compound that reversibly forms the lithium-containing compound by the reaction with the lithium ions includes one of a silicon, a titanium nitrate, and a tin oxide.

21. An active material for use in an electrode in a battery, comprising:
a material that can undergo oxidation-reduction reactions;
a coating on said material, said coating including one of a conductive agent and a mixture of the conductive agent and a conductive polymeric dispersant, the conductive polymeric dispersant being at least ionically conductive; and
another coating disposed on said material under said coating, wherein said another coating comprises one of $MPO_4$, $MSO_4$ and $MWO_4$ in which M is a group element 13.

22. A battery comprising:
a positive electrode;
a negative electrode; and
a separator including an electrolyte disposed between said positive and negative electrode,
wherein one of said positive electrode and said negative electrode includes:
a current collector,
an active material disposed on the current collector, and
a coating coated on the active material and including one of a mixture of a conductive agent and a dispersant and another mixture of the conductive agent and a conductive polymeric dispersant, and
the conductive polymeric dispersant is at least ionically conductive.

23. An battery of claim 22, wherein the active material comprises one of a metal, a lithium-containing alloy, a sulfur-based compound, compounds that reversibly forms lithium-containing compounds by a reaction with lithium ions, and a lithiated intercalation compound that reversibly intercalate/deintercalate the lithium ions.

24. The battery of claim 23, wherein the active material is the metal and is selected from lithium, tin, and titanium.

25. The battery of claim 23, wherein the active material is the lithium-containing alloy and is selected from a lithium-aluminum alloy, a lithium/tin alloy, and a lithium/magnesium alloy.

26. The battery of claim 23, wherein the active material is the sulfur-based compound and is selected from a sulfur element, $Li_2S_n(n \geq 1)$, an organic sulfur compound, and a carbon-sulfur polymer $((C_2S_x)_n$ where x=2.5 to 50 and $n \geq 2)$.

27. The battery of claim 23, wherein the active material is the compound that reversibly forms the lithium-containing compound by the reaction with the lithium ions and is selected from a silicon, a titanium nitrate, and a tin oxide.

28. The battery of claim 23, wherein the active material is the lithiated intercalation compound and is selected from a carbon-based material, a lithium-containing metal oxide, and a lithium-containing chalcogenide compound.

29. The battery of claim 23, wherein the active material is the carbon-based material and is one of an amorphous carbon, a crystalline carbon, and a mixture thereof.

30. The battery of claim 28, wherein an average diameter of the lithiated intercalation compound in particulate form is in a range of 1 to 50 $\mu$m.

31. The battery of claim 22, wherein the conductive agent includes one of a carbon-based conductive agent, a graphite-based conductive agent, a metal-based conductive agent and a metallic compound-based conductive agent.

32. The battery of claim 22, wherein an amount of the conductive agent in said coating is in a range of 0.1 to 10 wt. % of the active material.

33. The battery of claim 22, wherein an average particle diameter of the conductive agent in particulate form in the coating is 1 $\mu$m or less.

34. The battery of claim 22, wherein the coating is the mixture of the conductive agent and the conductive polymeric dispersant.

35. The battery of claim 34, wherein the conductive polymeric dispersant is selected from
a polypropylene oxide,
a polyethylene oxide,
a block copolymer of $(EO)_l(PO)_m(EO)_l$ where EO indicates ethylene oxide, PO indicates propylene oxide, and l and m are in the numerical range of 1 to 500,
a polyvinyl chloride (PVC),
an acrylonitrile/butadiene/styrene (ABS) polymer,
an acrylonitrile/styrene/acrylester (ASA) polymer,
a mixture of the ABS polymer and propylene carbonate,
a styrene/acrylonitrile (SAN) copolymer, and
a methylmethacrylate/acrylonitrile/butadiene/styrene (MABS) polymer.

36. The battery of claim 34, wherein an amount of the conductive polymeric dispersant is in a range of 0.1 to 20 wt. % of the conductive agent.

37. The battery of claim 22, wherein the coating comprises the mixture of the conductive agent and the dispersant, and the dispersant is selected from:
a polyacrylate-based resin;
a polyethylene oxide;
a block copolymer of $(EO)_l(PO)_m(EO)_l$ where EO indicates ethylene oxide, PO indicates propylene oxide, and l and m are in the numerical range of 1 to 500;
polyvinyl chloride (PVC);
an acrylonitrile/butadiene/styrene (ABS) polymer; an acrylonitrile/styrene/acrylester (ASA) polymer;
a mixture of the ABS polymer and propylene carbonate;
a styrene/acryionnitrile (SAN) copolymer; and
a methylmethacrylate/acrylonitrile/butadiene/styrene (MABS) polymer.

38. A method of manufacturing an active material for use in an electrode, comprising:
obtaining an active material; and
coating the active material with a coating including one of a mixture of a conductive agent and a dispersant and another mixture of the conductive agent and a conductive polymeric dispersant, the conductive polymeric dispersant being at least ionically conductive.

39. The method of 38, wherein said coating the active material comprises:
preparing a coating liquid in which the conductive agent, the dispersant, and a surfactant are dispersed in a solvent;
adding the active material to the coating liquid such that the conductive agent is coated onto a surface of the active material; and
heat-treating the coated active material to form the active material including the coating.

40. The method of 38, wherein said coating the active material comprises:
preparing a coating liquid in which a conductive agent and the dispersant are dispersed in a solvent;
mixing the active material with a surfactant-containing suspension;
mixing the coating liquid with the active material-surfactant-containing suspension such that the conductive agent is coated on a surface of the active material; and
heat-treating the coated active material to form the active material including the coating.

41. The method of 38, wherein said coating the active material comprises:
preparing a coating liquid wherein the conductive agent and the conductive polymeric dispersant are dispersed in a solvent to form the mixture of the conductive agent and the conductive polymeric dispersant;
adding the active material to the coating liquid to coat the mixture of the conductive agent and the conductive polymeric dispersant onto a surface of the active material; and drying the coated active material to form the active material including the coating.

42. The method of claim 38, wherein said coating the active material comprises:
   preparing a coating liquid in which a conductive agent and the dispersant are dispersed in a solvent,
   preparing a gelatin-containing suspension in which a gelatin is suspended in a solvent;
   adding an acid to the gelatin-containing suspension while controlling the pH thereof to 3 to 4;
   adding the active material to the gelatin-containing suspension and agitating the resulting suspension;
   removing gelatin residue from a surface of the active material to obtain an active material-containing suspension while controlling the pH of the active material-containing suspension to 5 to 8;
   mixing the coating liquid with the active material-containing suspension to coat the conductive agent onto the surface of the active material; and
   heat-treating the coated active material so that the gelatin disappears.

43. A method of manufacturing an active material for use in an electrode comprising:
   adding the active material and at least one surfactant selected from the group consisting of a phosphate-based surfactant, a sulfate-based surfactant, and a tungsten-based surfactant to an alcohol-based solvent;
   adding a compound of MX, where M is a group 13 element and X is a halogen element, to the active material-containing suspension such that $M^{3+}$ ions form static electricity bonds with the hydrophilic head group of the surfactant,
   filtering the active material with the static electricity bonds;
   baking the filtered active material with the static electricity bonds at a low temperature to form one of a mesoporous $MPO_4$, $MSO_4$, and $MWO_4$ coating layer on a surface of the active material.

44. A method of manufacturing a battery, comprising
   obtaining a positive electrode;
   obtaining a negative electrode; and
   combining the positive and negative electrodes separated by a separator having an electrolyte;
   wherein;
      at least one of the positive electrode and the negative electrode includes an active material coated with a coating including one of a mixture of a conductive agent and a dispersant and another mixture of the conductive agent and a conductive polymeric dispersant, and
      the conductive polymeric dispersant is at least ionically conductive.

45. The method of 44, further comprising:
   preparing a binder-containing solution wherein a binder is dissolved in a solvent;
   adding the coated active material to the binder-containing solution to prepare a slurry; and
   coating the slurry onto a current collector and compressing it to thereby obtain the one of the positive electrode and negative electrode including the coated active material.

46. The method of 44, further comprising:
   preparing a coating liquid wherein the conductive agent, the conductive polymeric dispersant and a binder are dispersed in a solvent;
   adding the active material to the coating liquid to thereby prepare a slurry where the conductive agent and the conductive polymeric dispersant are coated onto a surface of the active material; and
   coating the slurry onto a current collector and compressing it to thereby obtain one of the positive electrode and negative electrode including the coated active material.

47. An active material for use in an electrode in a battery, comprising:
   a material that can undergo oxidation-reduction reactions; and
   a coating on said material, said coating including a mixture of a conductive agent and a conductive polymeric dispersant,
   wherein:
      the conductive polymeric dispersant is at least ionically conductive, and
      said coating is coated by;
         preparing a coating liquid wherein the conductive agent and the conductive polymeric dispersant are dispersed in a solvent to form the mixture of the conductive agent and the conductive polymeric dispersant,
         adding the material to the coating liquid to coat the mixture of the conductive agent and the conductive polymeric dispersant onto a surface of the material, and
         drying the coated material to form the material including the coating.

48. An active material for use in an electrode in a battery, comprising:
   a material that can undergo oxidation-reduction reactions; and
   a coating on said material, said coating including a conductive agent, wherein said coating is coated by;
      preparing a coating liquid in which the conductive agent and a dispersant are dispersed in a solvent,
      preparing a gelatin-containing solution in which a gelatin is dissolved in a solvent,
      adding an acid to the gelatin-containing solution while controlling the pH thereof to 3 to 4,
      adding the material to the gelatin-containing solution and agitating the resulting solution,
      removing gelatin residue from a surface of the material to obtain an active material-containing solution while controlling the pH of the active material-containing solution to 5 to 8,
      mixing the coating liquid with the active material-containing solution to coat the conductive agent onto the surface of the active material, and
      heat-treating the coated active material so that the gelatin disappears.

* * * * *

UNITED STATES PATENT AND TRADEMARK OFFICE
CERTIFICATE OF CORRECTION

PATENT NO. : 6,878,487 B2  
APPLICATION NO. : 10/091335  
DATED : April 12, 2005  
INVENTOR(S) : Jae-Phil Cho Page 1 of 43

It is certified that error appears in the above-identified patent and that said Letters Patent is hereby corrected as shown below:

Replace the Abstract with the attached Abstract in its entirety.

Replace the Drawings with the attached Drawings in their entirety.

Replace the Specification with the attached Specification in its entirety.

Title Page, Item (57) change "Won-II Park" to --Won-Il Park--.

Column 16, line 46, change "coating" to --containing--.

Column 17, line 1, insert --containing-- after "lithium-".

Column 17, line 15, change "$Li_xMn_{1-y}M'_yA_2$, $Li_xMn_{1-y}M'_yO_{2-2}X_z$, $Li_xMn_zO_{4-z}X_7$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_2$, $Li_xNi_{1-y}Co_yO_2-_zX_z$, $Li_xNi_{1-y-z}Co_yM'_zA_g$, $Li_xNi_{1-y-z}Co_yM'_{zy}O_{2-o}X_o$, $Li_xNi_{1-y-z}Mn_yM'_zA_o$, and $Li_xNi_{1-y-z}Mn_yM'_zO_{2-o}X_o$" to --$Li_xMn_{1-y}M'_yA_2$, $Li_xMn_{1-y}M'_yO_{2-z}X_z$, $Li_xMn_2O_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_\alpha$, $Li_xNi_{1-y-z}Co_yM'_{zy}O_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$--.

Column 19, line 31, change "$C_z$" to --$C_2$--.

Column 20, line 15, change "$(EO)_1$" to --$(EO)_I$--.

Column 20, line 20, change "acryionnitrile" to --acrylonitrile--.

Column 21, line 28, change "MX" to --$MX_3$--.

UNITED STATES PATENT AND TRADEMARK OFFICE
CERTIFICATE OF CORRECTION

PATENT NO. : 6,878,487 B2
APPLICATION NO. : 10/091335
DATED : April 12, 2005
INVENTOR(S) : Jae-Phil Cho It is certified that error appears in the above-identified patent and that said Letters Patent is hereby corrected as shown below:

Column 21, line 44, change ";" to --:--.

Column 22, line 39, change ";" to --:--.

Signed and Sealed this

Twenty-sixth Day of September, 2006

JON W. DUDAS
*Director of the United States Patent and Trademark Office*

ABSTRACT OF THE DISCLOSURE

An active material for a battery is provided with a coating layer including either a conductive agent, or a coating layer having a mixture of a conductive agent, and a conductive polymeric dispersant.

TITLE OF THE INVENTION

ACTIVE MATERIAL FOR BATTERY AND METHOD OF PREPARING SAME

CROSS REFERENCE TO RELATED APPLICATIONS

[0001]    This application claims the benefit of U.S. Provisional Application Serial No. 60/316,949, filed September 5, 2001 in the U.S. Patent and Trademark Office, the disclosure of which is incorporated herein by reference.

BACKGROUND OF THE INVENTION

Field of the Invention

[0002]    The present invention relates to an active material for a battery and a method of preparing the same, and more particularly, to an active material for a battery having excellent electrochemical characteristics and thermal stability, and a method of preparing the same.

Description of the Related Art

[0003]    In recent times, due to reductions in size and weight of portable electronic equipment, there has been a need to develop batteries for use in the portable electronic equipment, where the batteries have both a high energy density and a high power density. Furthermore, it is required that such batteries be produced in a cost effective manner while being reliable and safe.

[0004]    Batteries are generally classified as primary batteries, which can be used only once and are then disposed of, and secondary batteries, which can be recharged and used repeatedly. Primary batteries include manganese batteries, alkaline batteries, mercury batteries, and silver oxide batteries. Secondary batteries include lead-acid storage batteries, nickel-metal hydride (Ni-MH) batteries, sealed nickel-cadmium batteries, lithium metal batteries, lithium ion batteries, lithium polymer batteries, and lithium-sulfur batteries.

[0005]    Such batteries generate electric power using an electrochemical reaction material (referred to hereinafter simply as the "active material") for a positive electrode and a negative electrode. Critical factors for determining a battery capacity, safety, and reliability are the electrochemical characteristics and the thermal stability of the active material. Thus, extensive research has been undertaken to improve these factors.

[0006] Of the currently available active materials for the negative electrode of the battery, lithium metal has a high electric capacity per unit mass and a high electronegativity. Thus, lithium metal can be well adapted for use in producing high capacity and voltage battery cells. However, since it is difficult to assure the safety of a battery using the lithium metal, other materials that can reversibly deintercalate and intercalate lithium ions are being used extensively for the active material of the negative electrodes in lithium secondary batteries.

[0007] For instance, in a lithium secondary battery cell, materials from or into which ions can be reversibly intercalated and deintercalated during charge and discharge reactions are used for the positive and negative electrodes. An organic electrolyte or a polymer electrolyte is contained between the positive and negative electrodes. The lithium secondary battery cell generates electric energy from changes in the chemical potential during intercalation/deintercalation of the lithium ions at the positive and negative electrodes.

[0008] A carbon-based material, such as amorphous carbon or crystalline carbon, has been used as the negative active material of the lithium secondary battery cell. Particularly, boron-coated graphite, where boron is added to the carbon-based material, has recently been highlighted as a high capacity negative active material.

[0009] It has been proposed that lithium metal oxides, such as $LiCoO_2$, $LiMn_2O_4$, $LiNiO_2$, $LiNi_{1-x}Co_xO_2$ ($0<x<1$) and $LiMnO_2$, or chalcogenide compounds, might be used as the positive active material for the lithium secondary batteries. Manganese-based positive active materials, such as the aforementioned $LiMn_2O_4$ and $LiMnO_2$, can be easily synthesized at a low cost while contributing little to environmental pollution. However, these manganese-based materials have relatively low capacity. $LiCoO_2$ has a high electrical conductivity, a high cell voltage and excellent electrode characteristics. This compound is currently the most popular material for positive electrodes of commercially available lithium secondary batteries. However, it is relatively expensive and has low stability during charge-discharge at high rate. Among the above positive active materials, $LiNiO_2$ involves the lowest cost while bearing the highest discharge capacity, but it is difficult to synthesize and the least stable among the compounds mentioned above.

[0010] 95% of the lithium secondary batteries that are circulated throughout the world use the $LiCoO_2$-based positive active material, and there have been continual attempts to replace this high-cost active material with a new one. The lithium secondary batteries use a powder form of $LiCoO_2$ for the positive electrode and exhibit a relatively long cycle life and an excellent discharge profile. However, there is still a need to make constant performance improvements to such batteries.

[0011] In order to improve the $LiCoO_2$-based positive active material, research has been carried out on the substitution of a metal oxide for a part of the Co. The Sony Corporation has developed a $LiCo_{1-x}Al_xO_2$ powder, where $Al_2O_3$ is doped at about 1 to 5 wt% and Al is substituted for part of the Co, and has applied it for use in mass production. In addition, the A&TB (Asahi & Toshiba Battery) Company has developed a positive active material where $SnO_2$ is doped, and Sn is substituted for part of the Co.

[0012] U.S. Patent No. 5,292,601 discloses $Li_xMO_2$, where M is one or more elements selected from Co, Ni or Mn, and x is 0.5 to 1, as an improved active material over $LiCoO_2$. Further, U.S. Patent No. 5,705,291 discloses a technique in which a material selected from boron oxide, boric acid, lithium hydroxide, aluminum oxide, lithium aluminate, lithium metaborate, silicon dioxide, lithium silicate or mixtures thereof is mixed with a lithiated intercalation compound, and the mixture is baked at 400 °C or more such that the oxide content is coated onto the surface of the lithiated intercalation compound.

[0013] Japanese Patent Laid-Open No. 9-55210 discloses a positive active material prepared by coating an alkoxide of Co, Al and Mn on the lithium-nickel based oxide, and heat-treating the alkoxide-coated oxide. Japanese Patent Laid-Open No. 11-16566 discloses a lithium-based oxide material coated with a metal selected from Ti, Sn, Bi, Cu, Si, Ga, W, Zr, B or Mo, and/or an oxide thereof. Japanese Patent Laid-Open No. 11-185758 discloses a positive active material in which a metal oxide is coated onto a lithium manganese oxide by dipping, and a heat treatment is performed thereto.

[0014] As shown in Fig. 3A, the currently available positive electrode is fabricated by dry-mixing an active material with a conductive agent, adding the mixture to a binder-containing solution to prepare a slurry, and coating the slurry onto a current collector and compressing it to thereby form an electrode. The conductive agent has a large surface area of $2500 m^2/g$ or more, and hence it causes an increase in the thickness of the electrode. Furthermore, the amount of active material is decreased by the amount of the conductive agent added, and this works as a hindrance to the fabrication of a high capacity battery.

[0015] In order to solve such a problem, it has been proposed that the amount of the conductive agent and the binder should be decreased. However, such a technique cannot well serve to improve the electrochemical characteristics of the battery.

[0016] In the above description, the positive active materials of the lithium secondary batteries and related examples of developments were explained. Recently, in relation to the tendency to develop portable electronic equipment that is more compact and lightweight, many types of batteries with the same requirements for an active material that guarantees battery performance, safety and reliability have been demanded, thereby fueling an acceleration of research and development on electrochemical properties and thermal stability of positive active materials to meet these demands.

SUMMARY OF THE INVENTION

[0017] It is an object of the present invention to provide an active material for a battery having an excellent electrochemical characteristics and thermal stability.

[0018] It is another object of the present invention to provide a method of preparing an active material for a battery in a cost-effective manner and having a high production efficiency.

[0019] It is still another object of the present invention to provide a high-density electrode for a battery.

[0020] It is a further object of the present invention to provide a battery that exhibits excellence in cell capacity and safety.

[0021] Additional objects and advantages of the invention will be set forth in part in the description which follows and, in part, will be obvious from the description, or may be learned by practice of the invention.

[0022] These and other objects are achieved using an active material for a battery according to an embodiment of the invention, the active material including with a coating layer including one of a conductive agent and a mixture of the conductive agent and a conductive polymeric dispersant.

[0023] According to another embodiment of the present invention, the active material is prepared by preparing a coating liquid in which a conductive agent, a dispersant, and a surfactant are dispersed in a solvent, adding the active material to the coating liquid such that the conductive agent is coated onto the surface of the active material, and heat-treating the coated active material.

[0024] According to another embodiment of the present invention, the active material is prepared by preparing a coating liquid wherein a conductive agent and a dispersant are dispersed in a solvent, adding the active material to a surfactant-containing suspension, and thoroughly mixing the suspension, mixing the coating liquid with the active material-containing suspension such that the conductive agent is coated onto a surface of the active material, and heat-treating the coated active material.

[0025] According to still another embodiment of the present invention, the active material is prepared by preparing a coating liquid wherein a conductive agent and a conductive polymeric dispersant are dispersed in a solvent, adding the active material to the coating liquid, coating the conductive agent and the conductive polymeric dispersant onto a surface of the active material, and heat-treating the coated active material.

[0026] According to yet another embodiment of the present invention, an electrode comprising the coated active material is fabricated by preparing a binder-containing solution wherein a binder is dissolved in a solvent, adding the coated active material to the binder-containing solution to thereby prepare a slurry, and coating the slurry onto a current collector and compressing it to thereby form an electrode.

[0027] According to a further embodiment of the present invention, the electrode is fabricated by preparing a coating liquid wherein a conductive agent, a conductive polymeric dispersant and a binder are dispersed in a solvent, adding an active material to the coating liquid to thereby prepare a slurry wherein the conductive agent and the conductive polymeric dispersant are coated onto a surface of the active material, and coating the slurry onto a current collector and compressing it to thereby form an electrode.

BRIEF DESCRIPTION OF THE DRAWINGS

[0028] The accompanying drawings, which are incorporated in and constitute a part of the specification, illustrate embodiments of the invention and, together with the description, serve to explain the principles, objects, and advantages of the invention.

Figure 14:
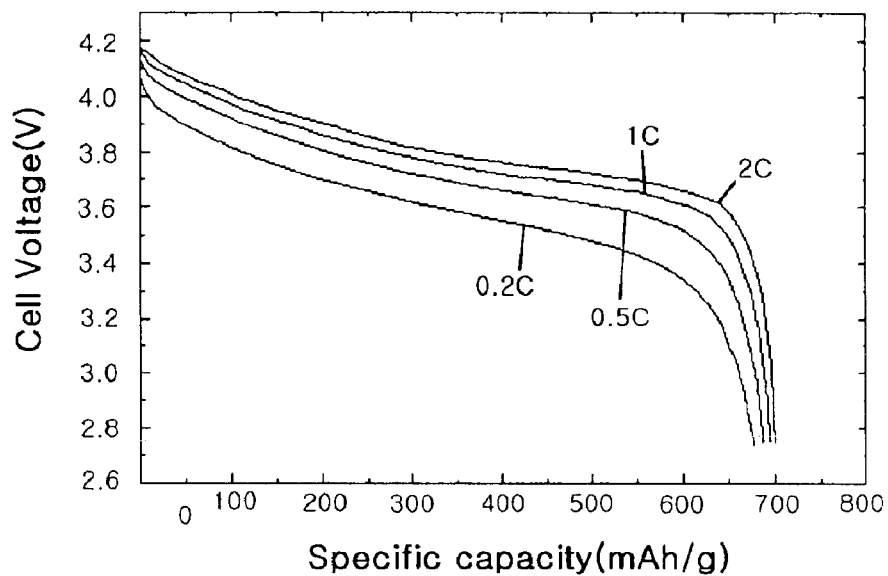
FIG. 14 is a graph illustrating the discharge capacity characteristic of a lithium ion battery cell with a positive active material according to Example 4.
Figure 16:
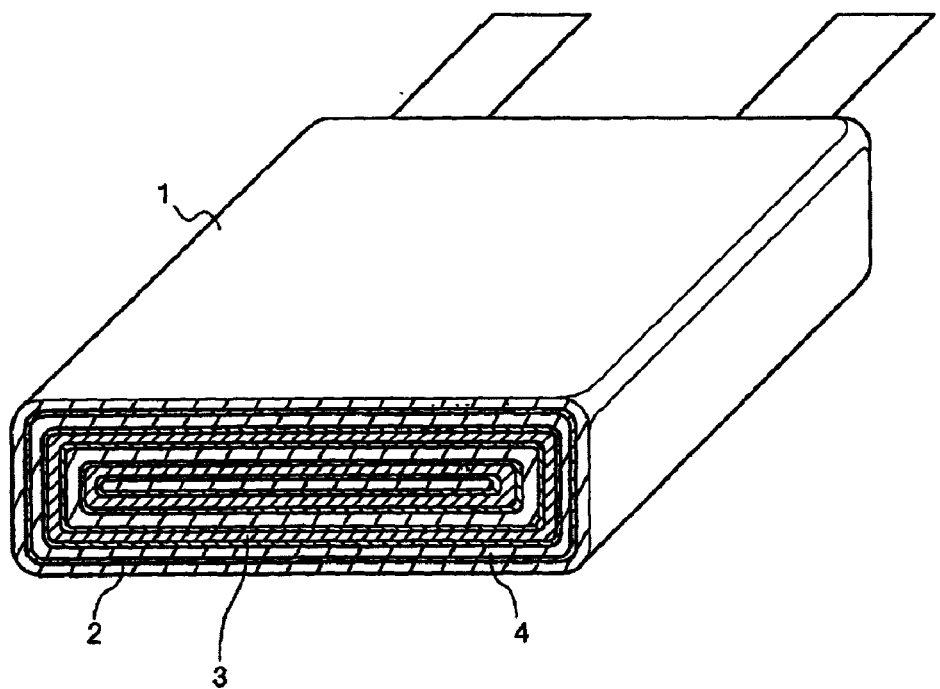

Fig. 1A illustrates the dispersion degree of a conductive agent in the presence of a dispersant;

Fig. 1B illustrates the dispersion degree of a conductive agent in the absence of the dispersant;

Fig. 2 illustrates the dispersion state of an active material with the addition of a surfactant;

Fig. 3A illustrates the conventional steps of fabricating an electrode using an active material;

Fig. 3B illustrates the steps of fabricating an electrode using an active material according to an embodiment of the present invention;

Fig. 3C illustrates the steps of fabricating an electrode using an active material according to another embodiment of the present invention;

Fig. 4 illustrates the combination state of a conductive polymeric dispersant and N-methyl pyrrolidone existent on the surface of an active material;

Figs. 5A and 5B are Scanning Electron Microscopy (SEM) photographs of a positive active material powder according to Comparative Example 1;

Figs. 6A and 6B are SEM photographs of a positive active material powder according to Example 1;

Figs 7A and 7B are SEM photographs of an electrode according to Comparative Example 1;

Figs. 8A and 8B are SEM photographs of an electrode according to Example 1;

Figs. 9A and 9B are SEM photographs of an electrode according to Example 2;

Fig. 10 is a graph illustrating the charge and discharge curves of a half-cell according to Comparative Example 1;

Fig. 11 is a graph illustrating the discharge capacity characteristic of a half-cell according to Example 1;

Fig. 12 is a graph illustrating the discharge capacity characteristic of a lithium ion battery cell with a positive active material according to Comparative Example 1;

Fig. 13 is a graph illustrating the discharge capacity characteristic of a lithium ion battery cell with a positive active material according to Example 1;

Fig. 14 is a graph illustrating the discharge capacity characteristic of a lithium ion battery cell with a positive active material according to Example 4;

Fig. 15 is a graph illustrating the cycle life characteristic of lithium ion battery cells with a positive active material according to Example 1; and FIG. 16 shows a lithium-sulfur battery according to an embodiment of the present invention.

DETAILED DESCRIPTION OF THE PREFERRED EMBODIMENTS

[0029] Reference will now be made in detail to embodiments of the present invention, examples of which are illustrated in the accompanying drawings and is specific examples wherein like reference numerals refer to the like elements throughout. The embodiments are described below in order to explain the present invention by referring to the figures.

[0030] Conventionally, an active material and a conductive agent are mixed in a slurry to fabricate an electrode. However, according to embodiments of the present invention, the conductive agent or a mixture of the conductive agent and a conductive polymeric dispersant is directly coated onto the active material. In this way, an amount of the conductive agent required to fabricate an electrode can be decreased. Consequently, the addition reaction of the conductive agent with the electrolyte is reduced while decreasing the occurrence of gas in the battery cell, which prohibits swelling of the battery cell while securing safety thereof.

[0031] Any material capable of electrochemically undergoing oxidation-reduction reactions can be used for the active material. Such materials include metals, lithium-containing alloys, sulfur-based compounds, compounds that can reversibly form lithium-containing compounds by a reaction with lithium ions, and all materials that can reversibly intercalate/deintercalate lithium ions (lithiated intercalation compounds). However, it is understood that the present invention is not limited to these active materials.

[0032] The metals include, but are not limited to lithium, tin or titanium. The lithium-containing alloys include a lithium/aluminum alloy, a lithium/tin alloy, and a lithium/magnesium alloy. The sulfur-based compounds, which form the positive active material of the lithium-sulfur battery, include a sulfur element, $Li_2S_n$ ($n \geq 1$), an organic sulfur compound, and a carbon-sulfur polymer ($(C_2S_x)_n$ where $x= 2.5$ to $50$ and $n \geq 2$). The compounds that can reversibly form a lithium-containing compound by a reaction with lithium ions include silicon, titanium nitrate and tin oxide.

[0033] The active materials that can reversibly intercalate/deintercalate lithium ions (lithiated intercalation compounds) include, but are not limited to carbon-based materials, lithium-containing metal oxides, and lithium-containing chalcogenide compounds. The carbon-based materials can be amorphous carbon, crystalline carbon, or a mixture thereof. Examples of amorphous carbon include soft carbon (low-temperature calcinated carbon), and hard carbon (high-temperature calcinated carbon). Examples of crystalline carbon include natural graphite or artificial graphite that are of a plate, sphere or fiber shape.

[0034] The lithium-containing metal oxides and lithium-containing chalcogenide compounds have monoclinic, hexagonal or cubic structures as basic structures.

[0035] Conventional lithium-containing compounds (lithium-containing metal oxide and lithium-containing chalcogenide compound) can be used as the lithiated intercalation compound of the present invention, and examples are compounds having the following formulas (1) to (13):

$$Li_xMn_{1-y}M'_yA_2 \qquad (1)$$

$$Li_xMn_{1-y}M'_yO_{2-z}X_z \qquad (2)$$

$$Li_xMn_2O_{4-z}X_z \qquad (3)$$

$$Li_xMn_{2-y}M'_yA_4 \qquad (4)$$

$$Li_xCo_{1-y}M'_yA_2 \qquad (5)$$

$$Li_xCo_{1-y}M'_yO_{2-z}X_z \qquad (6)$$

$$Li_xNi_{1-y}M'_yA_2 \qquad (7)$$

$$Li_xNi_{1-y}M'_yO_{2-z}X_z \qquad (8)$$

$$Li_xNi_{1-y}Co_yO_{2-z}X_z \qquad (9)$$

$$Li_xNi_{1-y-z}Co_yM'_zA_\alpha \qquad (10)$$

$$Li_xNi_{1-y-z}Co_yM'_{zy}O_{2-\alpha}X_\alpha \qquad (11)$$

$$Li_xNi_{1-y-z}Mn_yM'_zA_\alpha \qquad (12)$$

$$Li_xNi_{1-y-z}Mn_yM'_zO_{2-\alpha}X_\alpha \qquad (13)$$

wherein $0.95 \leq x \leq 1.1$, $0 \leq y \leq 0.5$, $0 \leq z \leq 0.5$, $0 \leq \alpha \leq 2$; M' is at least one element selected from the group consisting of Al, Ni, Co, Mn, Cr, Fe, Mg, Sr, V, and a rare-earth element; A is at least one element selected from the group consisting of O, F, S and P; and X is at least one element selected from the group consisting of F, S and P.

[0036] The average diameter of the lithium-containing compound is in the range of 1 to 50μm, preferably in the range of 5 to 20μm, and more preferably in the range of 5 to 10μm.

[0037] The coating layer formed on the surface of the active material according to an embodiment of the invention contains a conductive agent, or a mixture of the conductive agent and a conductive polymeric dispersant. The conductive agent is selected from a carbon-based conductive agent, a graphite-based conductive agent, a metal-based conductive agent or a metallic compound-based conductive agent, but it is not limited thereto.

[0038] KS6 (produced by the Timcal company) is the graphite-based conductive agent according to an embodiment of the invention. The carbon-based conductive agent is selected from Super P (produced by the MMM company), ketchen black, denka black, acetylene black, carbon black, thermal black, channel black, or activated carbon. The metal or metallic compound-based conductive agent may be selected from tin, tin oxide, or tin phosphate ($SnPO_4$), titanium oxide, and perovskite structures such as $LaSrCoO_3$, $LaSrMnO_3$, etc. However, it is understood that other graphite, carbon, and metal or metallic-compound-based conductive agents can be used.

[0039] According to an embodiment of the invention, an amount of the conductive agent in the coating layer is in the range of 0.1 to 10 wt% of the active material, and preferably in the range of 1 to 4 wt%. In the case the amount of the conductive agent is less than 0.1 wt%, the electrochemical characteristics of the active material deteriorate. By contrast, in the case the amount of the conductive agent is more than 10 wt%, the energy density per weight of the active material decreases.

[0040] An average particle diameter of the conductive agent in the coating layer is 1μm or less. In such a diameter range, the conductive agent is well attached to the surface of the active material. By contrast, the conductive agent cannot be well attached to the active material if the diameter range is greater than 1μm.

[0041] According to an embodiment of the present invention, the coated active material is prepared by preparing a coating liquid wherein a conductive agent, a dispersant and a surfactant are dispersed in a solvent. An active material is added to the coating liquid to thereby coat the conductive agent onto the surface of the active material. The coated active material is heat treated.

[0042] According to another embodiment of the present invention, the coated active material is prepared by preparing a coating liquid wherein a conductive agent and a dispersant are dispersed in a solvent. An active material is added to a surfactant-containing suspension to make an active material-containing suspension. The coating liquid is mixed with the active material-containing suspension to thereby coat the conductive agent onto the surface of the active material. The coated active material is heat treated.

[0043] According to an embodiment of the present invention, the dispersant to disperse the conductive agent is selected from a polyacrylate-based resin; polyethylene oxide; a block copolymer of $(EO)_l(PO)_m(EO)_l$ where EO indicates ethylene oxide, PO indicates propylene oxide, and l and m are in the numerical range of 1 to 500; polyvinyl chloride (PVC); an acrylonitrile/butadiene/styrene (ABS) polymer; an acrylonitrile/styrene/acrylester (ASA) polymer; a mixture of the ABS polymer and propylene carbonate; a styrene/acrylonitrile (SAN) copolymer; or a methylmethacrylate/acrylonitrile/butadiene/styrene (MABS) polymer. A resin of OROTAN is used for the polyacrylate-based resin according to an embodiment of the invention.

[0044] An amount of the dispersant is in the range of 0.1 to 20 wt% of the conductive agent according to an embodiment of the invention. The dispersion state of the conductive agent (Super P) in a solvent of N-methyl pyrrolidone with or without the dispersant in the N-methyl pyrrolidone solvent is illustrated in Figs. 1A and 1B. As shown in Fig. 1A, the conductive agent is uniformly dispersed in the presence of the dispersant. By contrast, as shown in Fig. 1B, the conductive agent is not uniformly distributed in the absence of the dispersant, but is conglomerated sporadically.

[0045] The surfactant works as a binder to bind the conductive agent to the active material. Non-ionic, anionic and cationic materials as well as organic or inorganic materials may be used as the surfactant. The surfactant includes a hydrophilic head group and a hydrophobic tail group in its respective molecules, where the hydrophilic head group includes an ionic group and a non-ionic group. The ionic group makes static electricity bonds, and the non-ionic group makes hydrogen bonds.

[0046] According to embodiments of the invention, compounds having the ionic group include sulfonate ($RSO_3^-$), sulfate ($RSO_4^-$), carboxylate ($RCOO^-$), phosphate ($RPO_4^-$), ammonium ($R_xH_yN^+$: x is in the numerical range of 1 to 3, and y is in the numerical range of 3 to 1), quaternary ammonium ($R_4N^+$), betaines ($RN^+(CH_3)_2CH_2COO^-$), and sulfobetaines ($RN^+(CH_3)_2CH_2SO_3^-$); and compounds having the non-ionic group include polyethylene oxide ($R\text{-}OCH_2CH_2(OCH_2CH_2)_nOH$), amine compounds, and gelatins. In the above compounds, R indicates saturated or non-saturated hydrogen carbide, where a number of carbons is in the range of 2 to 1000. The surfactant has a molecular weight in the range of 5 to 10,000, preferably in the range of 50 to 5000, and more preferably in the range of 50 to 300.

[0047] The active material is hydrophobic, so when it is dispersed in a solvent together with the surfactant, as shown in Fig. 2, the molecules of the active material are separated from each other, and dispersed.

[0048] According to an embodiment of the invention, an amount of the surfactant is 0.1 to 20 wt% of the conductive agent. Within this range, the amount of the conductive agent to be coated onto the active material can be controlled in a desired manner.

[0049] In the case of a surfactant with both anions and cations according to an embodiment of the invention, a pH of the coating liquid affects the amount of the conductive agent to be coated onto the active material. When betaines, sulfobetaines or gelatins are used as the surfactant, the pH of the surfactant-containing suspension to be added to the active material is kept at 3 to 4, and the pH of the conductive agent-containing suspension is kept at 5 to 8 when added to the active material containing suspension, and more preferably at 6 to 7.

[0050] The method of preparing a coated active material using gelatin according to an embodiment of the invention includes preparing a coating liquid wherein a conductive agent and a dispersant are dispersed in a solvent, preparing a gelatin-containing suspension wherein gelatin is suspended in a solvent and adding an acid to the gelatin-containing suspension while controlling the pH thereof to 3 to 4, adding an active material to a gelatin-containing suspension followed by agitation, removing the gelatin residue from the surface of the active material to obtain an active material-containing suspension while controlling the pH of the active material-containing suspension to 5 to 8, mixing the coating liquid with the active material-containing suspension to thereby coat the conductive agent onto the surface of the active material, and heat-treating the coated active material. The pH is controlled with the addition of an acid or base such as acetic acid, hydrochloric acid, sulfuric acid, or ammonia according to an embodiment of the invention.

[0051] The solvent is selected from water, an organic solvent, or a mixture thereof. The organic solvent is selected from alcohols such as methanol, ethanol and isopropanol, hexane, chloroform, tetrahydrofuran, ether, methylene chloride, acetone, acetonitrile, or N-methyl pyrrolidone (NMP). In the case the surfactant is a compound bearing an ionic group, an organic solvent is used for the solvent. In the case the surfactant is a compound bearing a non-ionic group, water is used for the solvent. However, it is understood that other solvents and organic solvents can be used.

[0052] The coating of the active material is made by way of a wet coating technique, such as spray coating or impregnation dip coating. However, other coating methods are possible.

[0053] In the above process according to an embodiment of the invention, the heat treatment is done at 100 to 500 °C, and a period of time for the heat treatment is in the range of 1 to 20 hours. The surfactant and the dispersant used for dispersing the conductive agent are removed during the heat treatment process. In the case the heat treatment temperature is less than 100 °C, surfactant residue remains at the surface of the active material, thereby negatively affecting the electrochemical characteristics thereof. In the case the heat treatment temperature is over 500 °C, the amount of the conductive agent is undesirably decreased.

[0054] Under the application of a conductive polymeric dispersant, the coated active material can be easily prepared as compared to the case where the usual surfactant is used.

[0055] In a further embodiment of the present invention, the active material coated with a mixture of a conductive polymeric dispersant and a conductive agent is prepared by preparing a coating liquid wherein a conductive agent and a conductive polymeric dispersant are dispersed in a solvent. An active material is added to the coating liquid such that the conductive agent and the conductive polymeric dispersant are coated onto the active material. The coated active material is then heat treated.

[0056] When a conductive polymeric dispersant is used as the surfactant, the conductive agent and the conductive polymeric dispersant coexist at the coating layer of the active material. That is, the conductive polymeric dispersant exists on the surface of the active material while being differentiated from a usual surfactant. As with the conductive agent, the conductive polymeric dispersant forms a conductive network to thereby improve the electrochemical characteristics of the active material. The conductive polymeric dispersant both disperses the conductive agent and functions as a surfactant to attach the conductive agent to the active material.

[0057] The conductive polymeric dispersant is selected from polyethylene oxide; polypropylene oxide; a block copolymer of $(EO)_l(PO)_m(EO)_l$ where EO indicates ethylene oxide, PO indicates propylene oxide, and $l$ and $m$ are in the numerical range of 1 to 500; polyvinylidene chloride (PVC); an acrylonitrile/butadiene/styrene (ABS) polymer; an acrylonitrile/styrene/acrylester (ASA) polymer; a mixture of the ABS polymer and propylene carbonate; a styrene/acrylonitrile (SAN) copolymer; or a methylmethacrylate/acrylonitrile/butadiene/styrene (MABS) polymer. Among them, the $(EO)_h(PO)_m(EO)_l$ is the best candidate for the conductive polymeric dispersant. However, it is understood that other conductive polymeric dispersants may be used.

[0058] In the $(EO)_h(PO)_m(EO)_l$ block copolymer, propylene oxide is hydrophobic, and hence is attached to the active material or the conductive agent. Ethylene oxide bears a hydrophilic property and is conductive, and hence it has a role of interconnecting the active material and the conductive agent while conducting the lithium ions. Currently available conductive polymeric dispersants may be selected from P-series in a cake state (produced by the BASF Company) or F-series in a powder state (also produced by the BASF Company).

[0059] The conductive agent frequently used in the conductive agent coating process with a usual surfactant can be directly used for the present conductive agent. It is preferable that the amount of the conductive polymeric dispersant is 0.1 to 20 wt% of the conductive agent, but it is understood that other weights are possible.

[0060] The solvent suitable for dispersing the conductive agent or the conductive polymeric dispersant may be selected from alcohols such as methanol, ethanol and isopropanol, hexane, chloroform, tetrahydrofuran, ether, methylene chloride, acetone, acetonitrile, or N-methyl pyrrolidone (NMP). However, it is understood that other solvents are also usable.

[0061] Since there is no need to remove the conductive polymeric dispersant, there is also no need for a heat treatment. Instead, a drying process occurring at a temperature of 100-C or less would be sufficient.

[0062] The coating of the active material is preferably made by way of a usual wet coating technique such as spray coating, and impregnation dip coating.

[0063] A coating layer based on $MPO_4$, $MSO_4$ or $MWO_4$, where M is a group element 13, may be formed on the active material using a surfactant to improve the stability and electrochemical characteristics of the active material. The group 13 element (according to the new IUPAC agreement) refers to the element group including Al of the Periodic Table. For instance, an active material with a coating layer of $MPO_4$ is prepared according to an embodiment of the invention by adding an active material and a phosphate-based surfactant to an alcohol-based solvent, adding a compound of $MX_3$, where M is a group 13 element and X is a halogen element, to the active material-containing suspension such that $M^{3+}$ ions form static electricity bonds with the hydrophilic head group of the surfactant, and filtering the active material with the static electricity bonds, and baking it at a low temperature to thereby form a mesoporous $MPO_4$ coating layer on the surface of the active material. When a sulfate-based surfactant is used instead of a phosphate-based surfactant, an $MSO_4$ coating layer is formed on the surface of the active material.

[0064] According to an embodiment of the invention, an active material for use in an electrode in a battery comprises an active material coated with a coating including one of a conductive agent and a mixture of the conductive agent and a conductive polymeric dispersant. The active material further comprises another coating disposed on the active material under the coating of the conductive polymeric dispersant and/or the conductive agent. The another coating comprises one of $MPO_4$, $MSO_4$ and $MWO_4$ in which M is a group element 13.

[0065] The coating layer using the conductive agent or the mixture of the conductive agent and the conductive polymeric dispersant reduces the internal resistance of the active material while preventing the discharge voltage thereof from being deteriorated. Accordingly, a high discharge voltage can be maintained in a constant manner irrespective of variation in the current density (C-rate). This result is because the conductive agent coated on the surface of the active material reduces the surface polarization. Accordingly, when the surface-treated active material is applied for practical use in the battery cell, the performance characteristics of the battery cell, such as cycle life, discharge voltage and power density can be improved.

[0066] When the active material coated with a conductive agent is used in battery cell fabrication, the density of the electrode active material is enhanced such that the energy density of the resulting battery cell is significantly heightened. Particularly, it can serve in the manufacture of slim, prismatic battery cells with a high capacity.

[0067] In order to be marketable, batteries must pass various stability tests. The penetration test, in which a nail is passed through a charged battery cell, is one such test that is critical for guaranteeing the stability of a battery. The stability of a battery depends on various factors, and in particular, on an exothermic reaction caused by a reaction of the charged positive electrode with an electrolyte immersed in the charged positive electrode.

[0068] For instance, when a battery cell including an $LiCoO_2$ active material is charged with a predetermined electric potential, $LiCoO_2$ is converted to $Li_{1-x}CoO_2$. The thermal stability of the active material can be judged based on the exothermic starting temperature and exothermic heat amount, through a differential scanning calorimetry (DSC) measurement of the charged material. The $Li_{1-x}CoO_2$ active material is unstable in its charged state. Accordingly, the internal temperature of the battery cell is heightened so that the oxygen content is separated from the cobalt content. The separated oxygen content reacts with the electrolyte, and this can cause an explosion of the battery cell. Therefore, the oxygen releasing temperature (the exothermic starting temperature) and the exothermic heat amount are important factors in representing the stability of the battery cell. The active material according to the present invention involves significantly reduced exothermic heat, and this insures thermal stability of the resulting battery cell.

[0069] A high-density electrode can be fabricated using the active material where a surface-treatment layer is present and that also includes a coating compound and a conductive agent. The electrode is fabricated by preparing a binder-containing solution where a binder is dissolved in a solvent, adding the active material to the binder-containing solution to prepare a slurry, and coating the slurry onto a current collector and compressing it to thereby form an electrode.

[0070] The conventional electrode fabrication process and the inventive electrode fabrication process are illustrated in Figs. 3A to 3C. As shown in Fig. 3A, in the conventional process, an active material and a conductive agent are added to a binder-containing solution to prepare a slurry, and the slurry is coated onto a current collector followed by compressing to thereby form an electrode. By contrast, in the process according to an embodiment of the present invention shown in Fig. 3B, the conductive agent is not added to the active material in preparing the slurry. That is, the active material with a conductive agent-based coating layer is added to a binder-containing solution to prepare a slurry, and the slurry is coated onto a current collector and is pressed to thereby form an electrode. In the resulting electrode, the conductive agent is distributed through the active material more uniformly than in the conventional electrode, which uses an uncoated active material. Furthermore, under the application of a conductive polymeric dispersant. In the embodiment shown in Fig. 3C, the active material coating process can be made during the process of preparing the slurry so that the overall processing steps can be simplified.

[0071] In the electrode fabrication process using the coated active material, the amount of the conductive agent can be reduced without influencing the electrochemical characteristics of the battery cell. Consequently, the addition reaction of the conductive agent with the electrolyte is reduced while decreasing the occurrence of gas in the battery cell. This reduces swelling of the battery cell while securing safety thereof.

[0072] Furthermore, the amount of binder to reinforce the bond of the conductive agent to the active material can be reduced together with that of the organic solvent for the slurry, of which N-methyl pyrrolidone is an example, decreasing production costs. The amount of active material is increased by the amount of the reduction of the conductive agent and the binder, resulting in enhanced electrode density. Accordingly, when the active material according to the present invention is used in fabricating a battery cell, the stability of the cell can be improved while maintaining the electrochemical characteristics thereof.

[0073] The coated active material has excellent adhesive strength with respect to the electrode, and hence the resulting battery cell does not suffer an increase in internal resistance thereof due to a detachment of the active material during cycling. Accordingly, when the electrode is fabricated using the coated active material according to the present invention, suitable adhesive strength can be obtained even with a reduction in the amount of binder.

[0074] In the case a conductive polymeric dispersant is used as the surfactant, the active material coated with the mixture of the conductive agent and the conductive polymeric dispersant can be added to a binder-containing solution to prepare a slurry. It is also possible that the binder, the conductive agent and the conductive polymeric dispersant can be mixed together with a solvent, and a non-coated active material can be added thereto to prepare a slurry. In the latter case, as shown in Fig. 3C, the process of coating the conductive agent and the conducting high molecule dispersant onto the active material, and the process of preparing the slurry may be done in one process according to an embodiment of the invention.

[0075] The process of fabricating an electrode using a conductive polymeric dispersant according to an embodiment of the invention includes preparing a coating liquid wherein a conductive agent, a conductive polymeric dispersant, and a binder are dispersed in a solvent, adding an active material to the coating liquid to prepare a slurry, and coating the slurry onto a current collector and compressing it to thereby form an electrode.

[0076] In order to manufacture a battery according to an embodiment of the present invention, a positive electrode and a negative electrode are obtained or fabricated. The positive and negative electrode are combined to be separated by a separator having an electrolyte. One or both of the positive and negative electrodes includes an active material coated with a coating including one of a conductive agent and a mixture of the conductive agent and a conductive polymeric dispersant.

[0077] The conductive polymeric dispersant is easily dissolved in the solvent, and it also facilitates good dissolution of the binder in the slurry. An amount of the conductive agent is 0.5 to 5 wt% of the active material, the amount of the conductive polymeric dispersant is 0.1 to 20 wt% of the conductive agent, and the amount of the binder is 0.5 to 20 wt% of the active material according to an embodiment of the present invention.

[0078] The coated active material of the present invention may be applied to the active material for a primary battery such as a manganese battery, an alkaline battery, a mercury battery, a silver oxide battery, as well as to the active material for a secondary battery such as a lead-acid storage battery, a Ni-MH (nickel metal hydride) battery, a nickel-cadmium battery, a lithium metal battery, a lithium ion battery, a lithium polymer battery and a lithium-sulfur battery. The structures of such batteries, including a lithium secondary battery shell, are well known, as indicated, e.g., by U.S. Patent No. 5,753,387, the disclosure of which is incorporated by reference herein. The active material having the surface-treatment layer is used in at least one of a positive electrode and a negative electrode of the above batteries.

[0079] As shown in FIG. 16, a lithium-sulfur battery using the active material according to an embodiment of the present invention includes a case 1 containing a positive electrode 3, a negative electrode 4, and a separator 2 interposed between the positive electrode 3 and the negative electrode 4. The separator 2 includes an electrolyte. One or both of the positive and negative electrodes 3 and 4 includes a current collector on which the active material is disposed, where a coating is coated on the active material and includes one of a conductive agent and a mixture of the conductive agent and a conductive polymeric dispersant.

[0080] The following examples further illustrate embodiment of the present invention. However, it is understood that the examples are for illustration only and that the invention is not limited to the examples.

Comparative Example 1

[0081] Polyvinylidene fluoride for a binder was added to N-methyl pyrrolidone to thereby prepare a binder-containing solution. A powder of $LiCoO_2$ with an average particle diameter of 10μm, which was a positive active material, and Super P, which was a conductive agent, were added to a binder-containing solution, and were mixed for 4 hours. The mixture was then aged for 4 hours to thereby form a slurry. The weight ratio of the positive active material, the conductive agent, and the binder was established to be 94/3/3. The slurry was coated onto an Al-foil to a thickness of about 100μm and pressed with a pressure of 1 ton to thereby fabricate a positive electrode for a coin cell. The positive electrode was punched to have a hole with a diameter of 1.6cm. A coin-type half-cell was fabricated using the positive electrode and a lithium metal as a counter electrode in a glove box. For the electrolyte, a 1M $LiPF_6$ solution of mixed solvent of ethylene carbonate and dimethyl carbonate in the volume ratio of 1:1 was used.

Comparative Example 2

[0082] A coin-type half-cell was fabricated in the same way as with Comparative Example 1 except that a powder of $LiMn_2O_4$ having an average particle diameter of 15μm was used for the positive active material.

Comparative Example 3

[0083] A coin-type half-cell was fabricated in the same way as with Comparative Example 1 except that a powder of $LiNi_{0.9}Sr_{0.002}Co_{0.1}O_2$ having an average particle diameter of 10μm was used for the positive active material.

Comparative Example 4

[0084] A coin-type half-cell was fabricated in the same way as with Comparative Example 1 except that a powder of $LiNi_{0.68}Mn_{0.25}Al_{0.05}Mg_{0.06}Co_{0.1}O_2$ having an average particle diameter of 10μm was used for the positive active material.

Comparative Example 5

[0085] A coin-type half-cell was fabricated in the same way as with Comparative Example 1 except that the weight ratio of the positive active material, the conductive agent and the binder was established to be 96/2/2.

Example 1

[0086] 100ml of water, 500g of zirconia balls, 3g of Super P for a conductive agent, and 0.5g of OROTAN (produced by the Hanchung Chem company) were poured into a 300ml plastic bottle, and ball-milled for 2 hours to thereby prepare a suspension wherein the Super P was completely dispersed.

[0087] A suspension of 1g of gelatin was suspended in 200ml of water and was thoroughly mixed. 100g of $LiCoO_2$ with an average particle diameter of 10μm was added to the suspension. The pH of the suspension was controlled to be 3 to 4 with the addition of acetic acid. The suspension was filtered to remove any gelatin not coated on the active material. Water was again added to the filtered suspension while controlling the pH thereof to be 5 to 8. The suspension with the completely dispersed Super P was then added to and thoroughly mixed with the pH-controlled suspension, for 5 minutes. Under such a pH condition, the $-COO^-$ group in the gelatin forms hydrogen bonds with the -OH group in the Super P.

[0088] After mixing, the Super P-coated $LiCoO_2$ was settled down so that it could be easily recovered. The upper solution was removed and precipitant was dried at 130 °C and baked at 300 °C for 10 minutes so that the gelatin content was completely removed from the $LiCoO_2$. As a result, a powder of $LiCoO_2$ coated with 0.5 wt% of Super P was produced. A binder-containing solution was prepared by mixing polyvinylidene fluoride for a binder with N-methyl pyrrolidone (NMP), and the $LiCoO_2$ powder was added to the binder-containing solution to thereby prepare a slurry. The weight ratio of the active material to the binder was established to be 99/1, and the Super P was not added thereto. The slurry was coated onto an Al-foil to a thickness of about 200μm and pressed with a pressure of 1 ton to fabricate a positive electrode for a coin cell. The positive electrode was punched to a diameter of 1.6cm. A coin-type half-cell was fabricated by using this positive electrode and a lithium metal as a counter electrode in a glove box. For the electrolyte, a 1M $LiPF_6$ solution of mixed solvent of ethylene carbonate and dimethyl carbonate in the volume ratio of 1:1 was used.

[0089] In the case the slurry was prepared using the positive active material of Comparative Example 1, the time period for mixing the slurry reached 4 or more hours because the active material and the conductive agent were not easily dispersed. In contrast, in the case the slurry was prepared using the positive active material of Example 1, the time period for mixing the slurry was significantly reduced while the dispersion of the active material and the conductive agent was made in a uniform manner. The time period for fabricating the electrode therefore becomes shortened, enhancing the cell production efficiency.

Example 2

[0090] A coin-type half-cell was fabricated in the same way as with Example 1 except that the amount of gelatin was 2g.

Example 3

[0091] A coin-type half-cell was fabricated in the same way as with Example 1 except that the amount of gelatin was 3g.

Example 4

[0092] A block copolymer of $(EO)_l(PO)_m(EO)_l$ (PLURONIC SERIES produced by the BASF company), and Super P were put into N-methyl pyrrolidone, and ball-milled for 6 hours. Polyvinylidene fluoride was added to the mixture, and $LiCoO_2$ with an average particle diameter of 10 μm was added thereto as an active material to thereby prepare a slurry. The oxygen content of the EO group in the block copolymer was well bonded to the positive (+) charge of the N-methyl pyrrolidone attached to the active material. For this reason, the Super P attached to the PO group was well coated on the surface of the $LiCoO_2$.

[0093] This process is schematically illustrated in Fig. 4. The weight ratio of the active material, the Super P and the polyvinylidene fluoride in the slurry was established to be 97:1:2. The amount of the block copolymer of $(EO)_l(PO)_m(EO)_l$ was 50 wt% of the Super P. The slurry was coated onto an Al-based foil to a thickness of about 200 μm and pressed with a pressure of 1 ton to thereby fabricate a positive electrode for a coin cell. The positive electrode was punched to a diameter of 1.6 cm. A coin-type half-cell was fabricated by using this positive electrode and a lithium metal as a counter electrode in a glove box. For the electrolyte, a 1M $LiPF_6$ solution of mixed solvent of ethylene carbonate and dimethyl carbonate in the volume ratio of 1:1 was used.

Example 5

[0094] A coin-type half-cell was fabricated in the same way as with Example 1 except that a powder of $LiMn_2O_4$ with an average particle diameter of 15 μm was used instead of the powder of $LiCoO_2$.

Example 6

[0095] A coin-type half-cell was fabricated in the same way as with Example 4 except that a powder of $LiMn_2O_4$ with an average particle diameter of 15 μm was used instead of the powder of $LiCoO_2$.

Example 7

[0096] A coin-type half-cell was fabricated in the same way as with Example 1 except that a powder of $LiNi_{0.9}Sr_{0.002}Co_{0.1}O_2$ with an average particle diameter of 10 μm was used instead of the powder of $LiCoO_2$.

Example 8

[0097] A coin-type half-cell was fabricated in the same way as with Example 4 except that a powder of $LiNi_{0.9}Sr_{0.002}Co_{0.1}O_2$ with an average particle diameter of 10 μm was used instead of the powder of $LiCoO_2$.

Example 9

[0098] A coin-type half-cell was fabricated in the same way as with Example 1 except that a powder of $LiNi_{0.66}Mn_{0.25}Al_{0.05}Mg_{0.05}Co_{0.1}O_2$ with an average particle diameter of 10 μm was used instead of the powder of $LiCoO_2$.

Example 10

[0099] A coin-type half-cell was fabricated in the same way as with Example 4 except that a powder of $LiNi_{0.66}Mn_{0.25}Al_{0.05}Mg_{0.05}Co_{0.1}O_2$ with an average particle diameter of 10 μm was used instead of the powder of $LiCoO_2$.

Example 11

[00100] A coin-type half-cell was fabricated in the same way as with Example 1 except that tin oxide ($SnO_2$) was used for the active material.

Example 12

[00101] A coin-type half-cell was fabricated in the same way as with Example 4 except that $SnO_2$ was used for the active material.

Example 13

[00102] A coin-type half-cell was fabricated in the same way as with Example 1 except that silicon (Si) was used for the active material.

Example 14

[00103] A coin-type half-cell was fabricated in the same way as with Example 4 except that silicon (Si) was used for the active material.

Example 15

[00104] 10g of a graphite powder and 0.1g of phosphoric acid ester (DEGRESSAL SD40 produced by the BASF company) were added to alcohol. Since the graphite powder is hydrophobic, the hydrophobic groups in the phosphate were bonded thereto. $AlCl_3$ was added to the solution such that $Al_3^+$ ions could be bonded to the hydrophilic head groups of the phosphate by way of static electricity bonding. The resulting solution was filtered, and baked at 300 °C to thereby obtain a graphite powder with mesoporous $AlPO_4$ uniformly coated on the surface thereof. A coin-type half-cell was fabricated using the graphite powder.

[00105] Figs. 5A and 5B are SEM photographs of the non-coated $LiCoO_2$ powder according to Comparative Example 1. Figs. 6A and 6B are SEM photographs of the $LiCoO_2$ powder coated with the Super P-based conductive agent according to Example 1. It can be verified from the photographs that the powder according to Example 1 has a surface shape entirely different from that according to Comparative Example 1.

[00106] Figs. 7A, 8A and 9A are SEM photographs of the electrodes according to Comparative Example 1, and Examples 1 and 4, respectively, and Figs. 7B, 8B and 9B are expanded photographs of those electrodes. In the electrode according to Comparative Example 1, it can be observed from the SEM photograph of Fig. 7A that the Super P is not existent on the surface of the active material, but it fills the empty portions of the electrode in a separate manner. However, in the electrodes according to Examples 1 and 4, it can be noticed from the SEM photographs of Figs. 8A and 9A that the Super P is coated on the surface of the active material while being distributed in a uniform manner.

[00107] The amount of the conductive agent in the electrodes according to Examples 1 to 3 (based on the electrode) and Comparative Example 1 and the density of the active material therein were computed, and the results are shown in Table 1.

Table 1

|  | Example 1 | Example 2 | Example 3 | Comparative Example 1 |
|---|---|---|---|---|
| Amount of conductive agent (wt%) | 0.15 | 0.3 | 0.5 | 3 |
| Density of active material (mg/cm$^2$) | 47 | 44 | 42 | 32 |

[00108] The density of the active material in the electrodes according to Examples 1 to 3 was increased by 30 to 40% compared to that according to Comparative Example 1 indicating that the density of the electrode would be also increased by 30 to 40%.

[00109] The coin-type half-cell according to Comparative Example 1 was charged and discharged at 0.2C, 0.5C and 1C rates in the voltage range of 2.75 to 4.3V, and the results are illustrated in Fig. 10. It can be observed from Fig. 10 that the cell capacity at the 1C rate is significantly deteriorated. Likewise, the cell according to Example 1 was charged and discharged, and the discharge characteristics thereof are illustrated in Fig. 11. It can be observed from the drawing that the discharge voltage of the cell at the 1C rate approximates that at the 0.2C rate. Furthermore, the discharge capacity at the 1C rate after the 40 cycling was decreased at most by 1% compared to the initial discharge capacity.

[00110] Prismatic lithium ion cells including the positive active materials of Examples and Comparative Examples were fabricated, and the capacity characteristics thereof at various C-rates were measured. The lithium ion cell was fabricated in the following way. A positive active material, and polyvinylidene fluoride for a binder, were mixed in the weight ratio of 98/2 to prepare a slurry. The slurry was coated onto an Al-foil and pressed to thereby fabricate a positive electrode. An artificial graphite was used as a negative active material and a polyvinylidene fluoride was used as a binder and were mixed in the weight ratio of 90/10 to prepare a slurry. The slurry was coated onto a Cu-foil and pressed to thereby fabricate a negative electrode. The negative and the positive electrodes were combined with each other, and an electrolyte was injected between them to thereby fabricate a 700mAh prismatic lithium ion cell. For the electrolyte, a 1M LiPF$_6$ solution of mixed solvent of ethylene carbonate and dimethyl carbonate in the volume ratio of 1:1 was used.

[00111] The capacity characteristics of the prismatic lithium ion cell including the positive active material of Comparative Example 1 at various C-rates were measured, and the results are illustrated in Fig. 12. It can be observed from the drawing that the discharge voltage of the cell at the 2C rate is significantly reduced compared to that at the 1C rate.

[00112] The capacity characteristics of the lithium ion cell including the positive active material of Example 1 at various C rates were measured, and the results are illustrated in Fig. 13. It can be observed from Fig. 13 that the battery cell exhibited good capacity characteristics even at the 2C rate.

[00113] In the lithium ion cell including the positive active material of Example 4, the capacity characteristics thereof at various the C-rates were measured, and the results are listed in Fig. 14. As shown in the drawing, the cell capacity exhibited good capacity characteristics even at the 2C rate. Furthermore, the discharge voltage at the 2C rate was not reduced much as compared to that at the 1C rate. This is because the conductive agent is coated on the surface of the active material while reducing the internal resistance thereof.

[00114] Two prismatic lithium ion cells were fabricated based on the positive active material of Example 1, and the cycle life characteristics thereof at the 1C rate were measured. The results are illustrated in Fig. 15. In the drawing, the diagonal line is the maintenance of the cycle life of 80%. Results show that, after 300 cycles, cycle life characteristics of the cells followed the 80% cycle-life maintenance line.

[00115] As described above, the active material according to the present invention is coated with a conductive agent or a mixture of the conductive agent and a conductive polymeric dispersant, and hence capacity, cycle life, and safety are improved. Furthermore, the active material adheres well to the electrode so that the resulting battery cell does not suffer an increase in internal resistance thereof due to detachment of the active material.

[00116] An electrode with the active material and the conductive agent uniformly distributed can be fabricated using the coated active material so that the electrochemical characteristics of the resulting battery cell can be improved.

[00117] The active material preparation technique according to the present invention involves a reduced processing time compared to other techniques. Furthermore, in this technique, the amount of conductive agent, binder, and slurry solvent can be reduced to be cost-effective while enhancing production efficiency.

[00118] The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

Super P(conductive agent) powders are conglomerated

Specific discharge capacity(mAh/g)